(12) United States Patent
Mathew et al.

(10) Patent No.: US 10,372,741 B2
(45) Date of Patent: Aug. 6, 2019

(54) APPARATUS FOR AUTOMATIC THEME DETECTION FROM UNSTRUCTURED DATA

(71) Applicant: Clarabridge, Inc., Reston, VA (US)

(72) Inventors: Thomas Mathew, Herndon, VA (US); Kenneth Robert Voorhees, Vienna, VA (US)

(73) Assignee: Clarabridge, Inc., Reston, VA (US)

( * ) Notice: Subject to any disclaimer, the term of this patent is extended or adjusted under 35 U.S.C. 154(b) by 171 days.

(21) Appl. No.: 13/783,063

(22) Filed: Mar. 1, 2013

(65) Prior Publication Data

US 2013/0268534 A1 Oct. 10, 2013

Related U.S. Application Data

(60) Provisional application No. 61/606,025, filed on Mar. 2, 2012, provisional application No. 61/606,021, filed on Mar. 2, 2012.

(51) Int. Cl.
 *G06F 16/30* (2019.01)
 *G06F 16/35* (2019.01)
 (Continued)

(52) U.S. Cl.
 CPC .............. *G06F 16/35* (2019.01); *G06F 17/27* (2013.01); *G06F 17/28* (2013.01); *G06F 17/277* (2013.01); *G06F 17/2785* (2013.01)

(58) Field of Classification Search
 CPC .... G06Q 10/10; G06Q 30/02; G06Q 30/0201; G06Q 50/01; G06F 17/30867;
 (Continued)

(56) References Cited

U.S. PATENT DOCUMENTS

| 3,576,983 A | 5/1971 | Cochran |
| 4,652,733 A | 3/1987 | Eng et al. |

(Continued)

FOREIGN PATENT DOCUMENTS

| DE | 10337934 A1 | 4/2004 |
| EP | 1083491 A2 | 3/2001 |

(Continued)

OTHER PUBLICATIONS

Jain, Anil K., Robert P. W. Duin, and Jianchang Mao. "Statistical pattern recognition: A review." IEEE Transactions on pattern analysis and machine intelligence 22.1 (2000): 4-37.*

(Continued)

*Primary Examiner* — Mark D Featherstone
*Assistant Examiner* — Diedra McQuitery
(74) *Attorney, Agent, or Firm* — Venable LLP; Michele V. Frank

(57) ABSTRACT

This apparatus provides a system and method of determining significant repeating themes in a collection of documents. The apparatus operates unsupervised and leverages a natural language processing mechanism supported with lexicon, synonym and taxonomy dictionaries to determine themes and establish their relevance using a two-level hierarchical structure. The apparatus also assigns meaningful names to identified themes and determines a set of rules that describe the theme such that it can be applied to categorize other documents outside of the collection as well.

41 Claims, 14 Drawing Sheets

(51) Int. Cl.
  *G06F 17/28* (2006.01)
  *G06F 17/27* (2006.01)
(58) Field of Classification Search
  CPC ........ G06F 17/30905; G06F 17/30864; G06F
      17/30011; G06F 17/30749; G06F
    17/2247; G06F 17/24; G06F 17/30265;
      G06F 17/271; G06F 17/2735; G06F
      17/2775; G06F 17/278; G06F 17/2795;
      G06F 17/2785; G06F 17/30; G06F
        17/30539; G06F 17/30595; G06F
        17/30598; G06F 17/3061; G06F
        17/30616; G06F 17/30654; G06F
        17/30672; G06F 17/30705; G06F
        17/30707; G06F 17/3071; G06F
        17/30719; G06F 17/30734; G06F
        17/3089; G06F 17/30908; G06F
        17/30967; G06F 17/30997; G06F
      2201/81; G06F 17/28; G06F 17/277;
        G06F 17/30713; G06N 5/02; G06N
      5/025; G06N 99/005; G06N 5/003; G06N
        3/08; G06N 5/04; G06N 3/088; Y10S
        707/99942; Y10S 707/944; Y10S
        707/99943; Y10S 707/99944; Y10S
                  707/99945
  USPC ...... 704/9; 705/7.29; 706/14, 46, 11, 12, 47,
      706/48, 52, 55, 20, 20.21; 707/E17.014,
        707/E17.108, E17.044, 737, 705,
        707/E17.005, E17.059, E17.089, 706,
        707/709, 736, 769, E17.002, E17.008,
      707/E17.033, E17.058, E17.069, E17.075,
        707/E17.084, E17.099, 722, 731, 740,
        707/741, 748, 749, 738, 739; 715/221,
            715/222, 255, 719, 764; 725/13
  See application file for complete search history.

(56) References Cited

U.S. PATENT DOCUMENTS

| | | | |
|---|---|---|---|
| 4,871,903 A | 10/1989 | Carrell | |
| 5,162,992 A | 11/1992 | Williams | |
| 5,255,356 A | 10/1993 | Michelman et al. | |
| 5,361,353 A | 11/1994 | Carr et al. | |
| 5,396,588 A | 3/1995 | Froessl | |
| 5,560,006 A | 9/1996 | Layden et al. | |
| 5,567,865 A | 10/1996 | Hauf | |
| 5,586,252 A | 12/1996 | Barnard et al. | |
| 5,608,904 A | 3/1997 | Chaudhuri et al. | |
| 5,634,054 A | 5/1997 | Sarachan | |
| 5,640,575 A | 6/1997 | Maruyama et al. | |
| 5,664,109 A | 9/1997 | Johnson et al. | |
| 5,708,825 A | 1/1998 | Sotomayor | |
| 5,768,578 A | 6/1998 | Kirk et al. | |
| 5,819,265 A | 10/1998 | Ravin et al. | |
| 5,887,120 A | 3/1999 | Wical | |
| 5,930,788 A | 7/1999 | Wical | |
| 5,983,214 A | 9/1999 | Lang et al. | |
| 6,003,027 A | 12/1999 | Prager | |
| 6,009,462 A | 12/1999 | Birrell et al. | |
| 6,052,693 A | 4/2000 | Smith et al. | |
| 6,061,678 A | 5/2000 | Klein et al. | |
| 6,078,924 A | 6/2000 | Ainsbury et al. | |
| 6,122,647 A | 9/2000 | Horowitz et al. | |
| 6,151,604 A | 11/2000 | Wlaschin et al. | |
| 6,154,213 A * | 11/2000 | Rennison .......... G06F 17/30716 345/428 |
| 6,163,775 A | 12/2000 | Wlaschin et al. | |
| 6,236,994 B1 | 5/2001 | Swartz et al. | |
| 6,332,163 B1 | 12/2001 | Bowman-Amuah | |
| 6,363,379 B1 | 3/2002 | Jacobson et al. | |
| 6,366,921 B1 | 4/2002 | Hansen et al. | |
| 6,449,620 B1 | 9/2002 | Draper et al. | |
| 6,564,215 B1 | 5/2003 | Hsiao et al. | |
| 6,584,470 B2 | 6/2003 | Veale | |
| 6,629,097 B1 | 9/2003 | Keith | |
| 6,643,661 B2 | 11/2003 | Polizzi et al. | |
| 6,665,685 B1 | 12/2003 | Bialic | |
| 6,681,370 B2 | 1/2004 | Gounares et al. | |
| 6,694,007 B2 | 2/2004 | Lang et al. | |
| 6,694,307 B2 | 2/2004 | Julien | |
| 6,728,707 B1 | 4/2004 | Wakefield et al. | |
| 6,732,097 B1 | 5/2004 | Wakefield et al. | |
| 6,732,098 B1 | 5/2004 | Wakefield et al. | |
| 6,735,578 B2 | 5/2004 | Shetty et al. | |
| 6,738,765 B1 | 5/2004 | Wakefield et al. | |
| 6,741,988 B1 | 5/2004 | Wakefield et al. | |
| 6,862,585 B2 | 3/2005 | Planalp et al. | |
| 6,886,010 B2 | 4/2005 | Kostoff | |
| 6,912,498 B2 | 6/2005 | Stevens et al. | |
| 6,970,881 B1 | 11/2005 | Mohan et al. | |
| 7,043,535 B2 | 5/2006 | Chi et al. | |
| 7,085,771 B2 | 8/2006 | Chung et al. | |
| 7,123,974 B1 | 10/2006 | Hamilton | |
| 7,191,183 B1 | 3/2007 | Goldstein | |
| 7,200,606 B2 | 4/2007 | Elkan | |
| 7,266,548 B2 | 9/2007 | Weare | |
| 7,320,000 B2 | 1/2008 | Chitrapura et al. | |
| 7,353,230 B2 | 4/2008 | Hamilton et al. | |
| 7,379,537 B2 | 5/2008 | Bushey et al. | |
| 7,523,085 B2 | 4/2009 | Nigam et al. | |
| 7,533,038 B2 | 5/2009 | Blume et al. | |
| 7,536,413 B1 * | 5/2009 | Mohan ................. G06F 16/355 |
| 7,844,566 B2 | 11/2010 | Wnek | |
| 7,849,048 B2 | 12/2010 | Langseth et al. | |
| 7,849,049 B2 | 12/2010 | Langseth et al. | |
| 8,166,032 B2 | 4/2012 | Sommer et al. | |
| 8,266,077 B2 | 9/2012 | Handley | |
| 8,301,720 B1 | 10/2012 | Thakker et al. | |
| 8,335,787 B2 | 12/2012 | Shein et al. | |
| 8,346,534 B2 | 1/2013 | Csomai et al. | |
| 2001/0018686 A1 | 8/2001 | Nakano et al. | |
| 2001/0025353 A1 | 9/2001 | Jakel | |
| 2001/0032234 A1 | 10/2001 | Summers et al. | |
| 2002/0065857 A1 | 5/2002 | Michalewicz et al. | |
| 2002/0078068 A1 | 6/2002 | Krishnaprasad et al. | |
| 2002/0111951 A1 | 8/2002 | Zeng | |
| 2002/0128998 A1 | 9/2002 | Kil et al. | |
| 2002/0129011 A1 | 9/2002 | Julien | |
| 2002/0143875 A1 | 10/2002 | Ratcliff | |
| 2002/0152208 A1 | 10/2002 | Bloedorn | |
| 2002/0156771 A1 | 10/2002 | Frieder et al. | |
| 2002/0161626 A1 | 10/2002 | Plante et al. | |
| 2002/0168664 A1 | 11/2002 | Murray et al. | |
| 2002/0194379 A1 | 12/2002 | Bennett et al. | |
| 2003/0014406 A1 | 1/2003 | Faieta et al. | |
| 2003/0016943 A1 | 1/2003 | Chung et al. | |
| 2003/0033275 A1 | 2/2003 | Alpha et al. | |
| 2003/0033295 A1 * | 2/2003 | Adler ................ G06F 17/30637 |
| 2003/0078766 A1 | 4/2003 | Appelt et al. | |
| 2003/0083908 A1 | 5/2003 | Steinmann | |
| 2003/0088562 A1 | 5/2003 | Dillon et al. | |
| 2003/0101052 A1 | 5/2003 | Chen et al. | |
| 2003/0110058 A1 | 6/2003 | Fagan et al. | |
| 2003/0120133 A1 | 6/2003 | Rao et al. | |
| 2003/0125988 A1 | 7/2003 | Rao et al. | |
| 2003/0130894 A1 | 7/2003 | Huettner et al. | |
| 2003/0144892 A1 | 7/2003 | Cowan et al. | |
| 2003/0149586 A1 | 8/2003 | Chen et al. | |
| 2003/0149730 A1 | 8/2003 | Kumar et al. | |
| 2003/0158865 A1 | 8/2003 | Renkes et al. | |
| 2003/0176976 A1 | 9/2003 | Gardner | |
| 2003/0177112 A1 | 9/2003 | Gardner | |
| 2003/0177143 A1 | 9/2003 | Gardner | |
| 2003/0188009 A1 | 10/2003 | Agarwalla et al. | |
| 2003/0204494 A1 | 10/2003 | Agrawal et al. | |
| 2003/0206201 A1 | 11/2003 | Ly | |
| 2003/0225749 A1 | 12/2003 | Cox et al. | |
| 2004/0010491 A1 | 1/2004 | Riedinger | |
| 2004/0044659 A1 | 3/2004 | Judd et al. | |

(56) References Cited

U.S. PATENT DOCUMENTS

| | | | |
|---|---|---|---|
| 2004/0049473 A1 | 3/2004 | Gower et al. | |
| 2004/0049505 A1 | 3/2004 | Pennock | |
| 2004/0103116 A1 | 5/2004 | Palanisamy et al. | |
| 2004/0111302 A1 | 6/2004 | Falk et al. | |
| 2004/0122826 A1 | 6/2004 | Mackie | |
| 2004/0167870 A1 | 8/2004 | Wakefield et al. | |
| 2004/0167883 A1 | 8/2004 | Wakefield et al. | |
| 2004/0167884 A1 | 8/2004 | Wakefield et al. | |
| 2004/0167885 A1 | 8/2004 | Wakefield et al. | |
| 2004/0167886 A1 | 8/2004 | Wakefield et al. | |
| 2004/0167887 A1 | 8/2004 | Wakefield et al. | |
| 2004/0167888 A1 | 8/2004 | Kayahara et al. | |
| 2004/0167907 A1 | 8/2004 | Wakefield et al. | |
| 2004/0167908 A1 | 8/2004 | Wakefield et al. | |
| 2004/0167909 A1 | 8/2004 | Wakefield et al. | |
| 2004/0167910 A1 | 8/2004 | Wakefield et al. | |
| 2004/0167911 A1 | 8/2004 | Wakefield et al. | |
| 2004/0172297 A1 | 9/2004 | Rao et al. | |
| 2004/0186826 A1 | 9/2004 | Choi et al. | |
| 2004/0194009 A1 | 9/2004 | LaComb et al. | |
| 2004/0215634 A1 | 10/2004 | Wakefield et al. | |
| 2004/0225653 A1 | 11/2004 | Nelken et al. | |
| 2004/0243554 A1 | 12/2004 | Broder et al. | |
| 2004/0243560 A1 | 12/2004 | Broder et al. | |
| 2004/0243645 A1 | 12/2004 | Broder et al. | |
| 2005/0004909 A1 | 1/2005 | Stevenson et al. | |
| 2005/0010454 A1 | 1/2005 | Falk et al. | |
| 2005/0015381 A1 | 1/2005 | Clifford et al. | |
| 2005/0038805 A1 | 2/2005 | Maren et al. | |
| 2005/0049497 A1 | 3/2005 | Krishnan et al. | |
| 2005/0050037 A1 | 3/2005 | Frieder et al. | |
| 2005/0055355 A1 | 3/2005 | Murthy et al. | |
| 2005/0059876 A1 | 3/2005 | Krishnan et al. | |
| 2005/0065807 A1 | 3/2005 | DeAngelis et al. | |
| 2005/0065941 A1 | 3/2005 | DeAngelis et al. | |
| 2005/0065967 A1 | 3/2005 | Schuetze et al. | |
| 2005/0086215 A1 | 4/2005 | Perisic | |
| 2005/0086222 A1 | 4/2005 | Wang et al. | |
| 2005/0091285 A1 | 4/2005 | Krishnan et al. | |
| 2005/0108256 A1 | 5/2005 | Wakefield et al. | |
| 2005/0108267 A1 | 5/2005 | Gibson et al. | |
| 2005/0165712 A1 | 7/2005 | Araki et al. | |
| 2005/0240984 A1 | 10/2005 | Farr et al. | |
| 2005/0243604 A1 | 11/2005 | Harken et al. | |
| 2005/0267872 A1* | 12/2005 | Galai | G06F 17/30864 |
| 2005/0278362 A1* | 12/2005 | Maren | G06F 16/90 |
| 2006/0242190 A1* | 10/2006 | Wnek | G06F 16/367 |
| 2006/0253495 A1 | 11/2006 | Png | |
| 2007/0011134 A1 | 1/2007 | Langseth et al. | |
| 2007/0011175 A1 | 1/2007 | Langseth et al. | |
| 2007/0282824 A1* | 12/2007 | Ellingsworth | G06F 17/30707 |
| 2008/0010274 A1* | 1/2008 | Carus | G06N 99/005 |
| 2008/0071872 A1* | 3/2008 | Gross | G06Q 10/107 709/206 |
| 2008/0133488 A1* | 6/2008 | Bandaru | G06F 16/951 |
| 2008/0249764 A1 | 10/2008 | Huang et al. | |
| 2009/0037457 A1 | 2/2009 | Musgrove | |
| 2009/0063481 A1* | 3/2009 | Faus | G06F 17/2705 |
| 2009/0292583 A1 | 11/2009 | Eilam et al. | |
| 2009/0307213 A1 | 12/2009 | Deng et al. | |
| 2009/0319342 A1 | 12/2009 | Shilman et al. | |
| 2010/0017487 A1* | 1/2010 | Patinkin | G06Q 10/107 709/206 |
| 2010/0049590 A1 | 2/2010 | Anshul | |
| 2010/0114561 A1* | 5/2010 | Yasin | G06F 17/3071 704/9 |
| 2010/0121849 A1* | 5/2010 | Goeldi | G06Q 10/00 707/736 |
| 2010/0153318 A1 | 6/2010 | Branavan et al. | |
| 2010/0223276 A1* | 9/2010 | Al-Shameri | G06F 17/30333 707/769 |
| 2010/0228693 A1* | 9/2010 | Dawson | G06F 17/2705 706/12 |
| 2010/0235313 A1* | 9/2010 | Rea et al. | 706/52 |
| 2010/0235854 A1* | 9/2010 | Badgett | G09B 7/00 725/24 |
| 2010/0241620 A1 | 9/2010 | Manister et al. | |
| 2010/0312769 A1* | 12/2010 | Bailey | G06F 16/95 707/740 |
| 2010/0332287 A1 | 12/2010 | Gates et al. | |
| 2011/0106807 A1 | 5/2011 | Srihari et al. | |
| 2011/0137707 A1 | 6/2011 | Winfield et al. | |
| 2011/0161333 A1 | 6/2011 | Langseth et al. | |
| 2011/0231394 A1 | 9/2011 | Wang et al. | |
| 2011/0276513 A1 | 11/2011 | Erhart et al. | |
| 2011/0282858 A1 | 11/2011 | Karidi et al. | |
| 2011/0302006 A1 | 12/2011 | Avner et al. | |
| 2012/0259617 A1 | 10/2012 | Indukuri et al. | |
| 2012/0265806 A1* | 10/2012 | Blanchflower | G06Q 10/10 709/204 |
| 2012/0290622 A1 | 11/2012 | Kumar et al. | |
| 2013/0024389 A1* | 1/2013 | Gupta | G06Q 30/0201 705/319 |
| 2013/0096909 A1* | 4/2013 | Brun et al. | 704/9 |

FOREIGN PATENT DOCUMENTS

| | | |
|---|---|---|
| JP | 1021249 A | 1/1989 |
| JP | 2004258912 A | 9/2004 |
| WO | WO-96/30845 A1 | 10/1996 |
| WO | WO-98/35469 A2 | 8/1998 |
| WO | WO-00/26795 A1 | 5/2000 |
| WO | WO-02/082318 A2 | 10/2002 |
| WO | WO-02/095616 A1 | 11/2002 |
| WO | WO-03/04892 A1 | 1/2003 |
| WO | WO-03/040878 A2 | 5/2003 |
| WO | WO-03/098466 A1 | 11/2003 |
| WO | WO-2004/104865 A2 | 12/2004 |
| WO | WO-2007/005730 A2 | 1/2007 |
| WO | WO-2007/005732 A2 | 1/2007 |
| WO | WO-2007/021386 | 2/2007 |

OTHER PUBLICATIONS

Pak, Alexander & Paroubek, Patrick. (2010). Twitter as a Corpus for Sentiment Analysis and Opinion Mining. Proceedings of LREC. 10.*

Jain, A. K., Duin, R. P. W., & Mao, J. (2000). Statistical pattern recognition: A review. IEEE Transactions on pattern analysis and machine intelligence, 22(1), 4-37. (Year: 2000).*

Pak, A., & Paroubek, P. (May 2010). Twitter as a corpus for sentiment analysis and opinion mining. In LREc (vol. 10, No. 2010, pp. 1320-1326). (Year: 2010).*

"Adding Structure to the Unstructured-Computer Business Review;", http://www.cbr-online.com, World Wide Web, May 25, 2005, pp. 1116.

"EIQ Server", http://www.whamtech.com/eiq_server.htm>, World Wide Web, May 25, 2005, pp. 1-3.

"GEDDM—Grid Enabled Distributed Data Mining", http://www.qub.ac.uk/escience/projects/geddm/geddm handout.pdf, World Wide Web, pp. 1-2.

"Innovative Applications;", http://www2002.oreispector.pdg, World Wide Web, pp. 1-5.

Agrawal et al., "Athena: Mining-Based Interactive Management of Text Databases," 2000, EDBT, LNCS 1777, 365-379.

Alani et al., "Automatic Ontology-Based Knowledge Extraction from Web Documents," IEEE Computer Society, 2003.

Bourret, "Persistence: SGML and XML in Databases", http://www.isemlug.org/database.html, World Wide Web, 2002, pp. 1-5.

Buttler et al., "Rapid Exploitation and Analysis of Documents," Lawrence Livermore National Laboratory, Dec. 2011, pp. 1-40.

Clark, "XSL Transformations (XSLT) Version 1.0," W3C, 1999.

Crosman, "Content Pipeline", http://messagingpipeline.com/shared/article/printableArticleSrc.jhtml?articleId=51201811>, World Wide Web, Nov. 1, 2004, pp. 1-8.

Darrow, "IBM Looks to Viper Database to Combat Oracle, Microsoft", http://www.bizintellignecepipeline.com/shared/article/printable.ArticleSrc.Jhtml, World Wide Web, May 25, 2005, pp. 1-5.

(56) References Cited

OTHER PUBLICATIONS

Das et al., "Opinion Summarization in Bengali: A Theme Network Model," Retrieved From: http://ieeexplore.ieee.org/xpl/login.jsp?tp=&arnumber=5591520&url=http%3A%2F%2Fieeexplore.ieee.org%2Fxpls%2Fabs_all.jsp%3Farnumber%3D5591520, Aug. 20-22, 2010, pp. 675-682.

Das et al., "Theme Detection an Exploration of Opinion Subjectivity," IEEE, 2009, pp. 1-8.

Embley et al., "Ontology-Based Extraction and Structuring of Information form Data-Rich Unstructured Documents," In Proceedings of the Conference on Information and Knowledge Management (CIKM'98), 1998.

Extended European Search Report issued in Application No. 06774414.4 dated Dec. 27, 2010.

Extended European Search Report issued in Application No. 06774415.4 dated Dec. 27, 2010.

Ferrucci, "Building an Example Application With the Unstructured Information Management Architecture", http://www.findarticles.com/p/articles/mi mISJ/is 3 43/ain7576557/print, World Wide Web, Mar. 16, 2004, pp. 1-22.

Gamon et al., "Pulse: Mining Customer Opinions from Free Text," Springer-Verlag Berline Heidelberg, 2005.

Ghanem et. al., "Dynamic Information Integration for E-Science", http://www.discovery-on-the.net/documents/DynamicInformationintegration.pdf>, World Wide Web, pp. 1-2.

Gold-Bernstein, "EbizQ Integration Conference", http://www.ebizq.net/topics/portals/features/4371.html?page=2&pp=1>, World Wide Web, May 10, 2005, pp. 1-5.

Harabagiu et al., "Using Topic Themse for Multi-Document Summarization," ACM Transactions on Information Systems, vol. 28, No. 3, Jun. 2010, pp. 1-47.

Hearst, Marti A., "Untangling Text Data Mining," Proceeding of the 37th annual meeting of the Association for Computational Linguistics on Computational Linguistics, 1999.

Hu et al., "Mining Opinion Features in Customer Reviews," American Association for Articial Intelligence, 2004 pp. 1-6.

Infoconomy Staff, "Enterprise Search Tools", http://www.infoconomy.com/pages/infoconomist-crib-sheets/group101866.adp, World Wide Web, Dec. 1, 2004, pp. 1-5.

International Preliminary Report on Patentability issued in Application No. PCT/US2006/025810 dated Jan. 10, 2008.

International Preliminary Report on Patentability issued in Application No. PCT/US2006/025811 dated Jan. 9, 2008.

International Search Report issued in Application No. PCT/US2006/025810 dated Jul. 27, 2007.

International Search Report issued in Application No. PCT/US2006/025811 dated Feb. 16, 2007.

International Search Report issued in Application No. PCT/US2006/025814 dated Jan. 3, 2007.

Kelly et al., "Roadmap to checking data migration," 2003, *Elsevier*, 506-510.

Keogh et al., On the Need for Time Series Data Mining Benchmarks: A survey and Empirical Demonstration, 2003, Data Mining and Knowledge Discovery, 7:349-371.

Kim et al., "Automatic Identification of Pro and Con Reasons in Online Reviews," ACL 2006, pp. 1-8.

Kim et al., "Determining the Sentiment of Opinions," ACM, 2004.

Kugel, "Transform Magazine: Unstructured Information Management", http://www.transformmag.com/shard/cp/print articlejthm hsessionid. >, World Wide Web, Dec. 2003, pp. 1-3.

Lau et al., "Automatic Labelling of Topic Models," Proceedings of the 49th Annual Meeting of the Association for Computational Linguistics, Jun. 19-24, 2011, pp. 1536-1545.

Ma et al., "Extracting Unstructured Data from Template Generated Web Documents," 2003, *CIKM*, 512-515.

Moschitti et al., "Open Domain Information Extraction via Automatic Semantic Labeling," American Association for Artificial Intelligence, 2003.

Nagao et al., "Automatic Text Summarization Based on the Global Document Annotation," International Conference on Computational Linguistics Proceedings, 1998, vol. 2, p. 917-921.

Notice of Allowance issued in U.S. Appl. No. 11/172,955 dated Aug. 16, 2010, 20 pages.

Notice of Allowance issued in U.S. Appl. No. 11/172,956 dated Aug. 18, 2010, 19 pages.

Office Action issued in U.S. Appl. No. 11/172,955 dated Apr. 29, 2009, 38 pages.

Office Action issued in U.S. Appl. No. 11/172,955 dated Jan. 5, 2010, 37 pages.

Office Action issued in U.S. Appl. No. 11/172,955 dated Jul. 25, 2007, 39 pages.

Office Action issued in U.S. Appl. No. 11/172,955 dated May 30, 2008, 43 pages.

Office Action issued in U.S. Appl. No. 11/172,956 dated Apr. 28, 2009, 28 pages.

Office Action issued in U.S. Appl. No. 11/172,956 dated Aug. 8, 2007; 26 pages.

Office Action issued in U.S. Appl. No. 11/172,956 dated Jan. 7, 2010, 34 pages.

Office Action issued in U.S. Appl. No. 11/172,956 dated May 30, 2008, 27 pages.

Office Action issued in U.S. Appl. No. 11/172,957 dated Aug. 8, 2007, 35 pages.

Office Action issued in U.S. Appl. No. 12/959,805 dated Mar. 31, 2011, 26 pages.

Examiner Interview Summary issued in U.S. Appl. No. 11/172,955, dated Feb. 1, 2008, 2 pages.

Examiner Interview Summary issued in U.S. Appl. No. 11/172,955, dated Oct. 22, 2009, 4 pages.

Examiner Interview Summary issued in U.S. Appl. No. 11/172,956, dated Jan. 28, 2008, 3 pages.

Pang et al., "Thumbs Up? Sentiment Classification using Machine Learning Techniques," Proceedings of the Conference of Empirical Methods in Natural Language Processing (EMNLP), 2002, pp. 79-86.

Park et al., "Co-trained support vector machines for large scale unstructured document classification using unlabeled data and syntactic information," Information Processing and Management, 2004.

Patro et al., "Seamless Integration of Diverse Types into Exploratory Visualization Systems," Eurographics, 2003.

Pradhan et al., "Semantic Role Parsing: Adding Semantic Structure to Unstructured Text," Proceedings of the Third IEEE International Conference on Data Mining (ICDM.03), 2003.

Russom, Philip, "How to Evaluate Enterprise ETL," Tech Choices, 2004.

Spector, "Architecting Knowledge Middleware;" http://itlab.uta.edu/idm01/FinalReports/Innovation.pdf, World Wide Web, 2002, pp. 1-40.

Swoyer, "IBM's BI Middleware Play: Its All About Integration, Partnerships", http://www.tdwi.org/Publications/display.aspx?id+7267&t=y, World Wide Web, Nov. 3, 2004, pp. 1-3.

The Unstructured Information Management Architecture Project, http://www.research.ibm.com/UIMA/>, World Wide Web, May 25, 2005, pp. 1-2.

Tkach, Daniel S., "Information Mining with the IBM Intelligent Miner Family," IBM, 1998.

Vesset et al., "White Paper: Why Consider Oracle for Business Intelligence?" IDC, 2004.

Wang et. al., "Database Research at Watson", http://www.research.ibm.com/scalabledb/semistruct.html, World Wide Web, May 25, 2005, pp. 1-3.

Written Opinion of the International Searching Authority issued in Application No. PCT/US2006/025810 dated Jul. 27, 2007.

Written Opinion of the International Searching Authority issued in Application No. PCT/US2006/025811 dated Feb. 16, 2007.

Yang et al., "Automatic Category Theme Identification and Hierarchy Generation for Chinese Text Categorization," Kluwer Academic Publishers, 2000, pp. 1-26.

Zheng, "Tradeoffs in Certificate Revocation Schemes," Apr. 2003, ACM SIGCOMM Computer Communications Review, 33:2:103-112.

(56) References Cited

OTHER PUBLICATIONS

Zornes, "EA Community Articles", http://www.eacommunity.com/articles/openarticle.asp?ID=1834>, World Wide Web, May 25, 2005, pp. Jan. 3, 2013.

* cited by examiner

APPARATUS FOR AUTOMATIC THEME DETECTION FROM UNSTRUCTURED DATA

CROSS-REFERENCE TO RELATED APPLICATIONS

This application claims the benefit of U.S. Provisional Patent Application No. 61/606,025, filed Mar. 2, 2012, and also claims the benefit of U.S. Provisional Patent Application No. 61/606,021, filed Mar. 2, 2012, the contents of each of which are hereby incorporated by reference herein in their entirety.

FIELD OF THE INVENTION

Various embodiments are directed generally to data analysis and specifically to methods and systems for analysis of unstructured data.

BACKGROUND OF INVENTION

The current social media boom has made it easy for individuals to publically describe, publish and disseminate their experiences with conducting business with specific organizations to a large audience. Today, a large number of organizations attempt to tap into such customer feedback to understand problem areas faced by their customers, and to use such feedback to make improvements and corrections.

In order to meaningfully analyze the potentially large volume of customer feedback that a business may collect, a typical approach may predefine topics/themes relevant to a specific business function and then develop an approach to map specific customer feedback to an appropriate theme. Typical approaches to mapping feedback to themes are mapping based on rule based patterns or using machine learning techniques.

Once mapped to themes, feedback may then be quantified and analyzed based on the volume associated with a discussion theme. However the use of a predefined set of themes to analyze unstructured data is inherently limiting—previously unseen problems may never get captured by a predefined template of themes and a lot of valuable feedback could get overlooked.

The ability for a business to automatically detect topics of discussion amongst their customers would considerably accelerate the ability of the business to respond to problems. Improved responsiveness would likely improve overall customer satisfaction which in turn would drive greater customer retention and profitability.

Human language is very complex and the authors of documents can choose to describe the same theme in many different ways which makes automatic identification of significant themes a very hard task. However, previous attempts at employing unsupervised techniques have so-far provided limited business value as cluster groupings are generally unintuitive to human interpretation.

Various embodiments includes systems and methods for automatic unsupervised detection of discussion topics from unstructured feedback text wherein the results of topic groupings are tagged with meaningful labels.

SUMMARY OF INVENTION

Various embodiments are directed generally to data analysis and specifically to methods and systems for analysis of unstructured data.

One embodiment may include a system comprising: a repository of unstructured documents; a theme detection component configured to: process the unstructured documents; discover themes; assign labels to each discovered theme; identify patterns that describe each theme; and organize the themes in a hierarchy; and a user interface configured to: allow an operator to initiate theme detection by the theme detection component; and allow an operator to view and interact with the results of the theme detection, wherein the results comprise at least one of the assigned labels, the patterns, and the hierarchy.

One embodiment may include a method of determining themes from a collection of unstructured text documents, the method comprising: receiving a set of unstructured text documents to process; determining, by a computing system, frequently occurring terms within the set of unstructured text documents; determining, by the computing system, a label for each term in the frequently occurring terms; determining, by the computing system, one or more text patterns, wherein the one or more text patterns are used to identify if the term is contained within a document; and creating, by the computing system, a category model to organize the identified terms as themes of top level themes.

One embodiment may include a computer readable storage medium comprising instructions that if executed enables a computing system to: receive a set of unstructured text documents to process; determine frequently occurring terms within the set of unstructured text documents; determine a label for each term in the frequently occurring terms; determine one or more text patterns, wherein the one or more text patterns are used to identify if the term is contained within a document; and create a category model to organize the identified terms as themes of top level themes.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention.

DETAILED DESCRIPTION OF THE EMBODIMENTS

The present disclosure enables a mechanism to determine themes from unstructured data. Such a capability is not possible with existing unstructured and structured data analysis tools.

Certain embodiments provide an apparatus to process unstructured text to automatically determine without supervision, relevant topics of discussion. From the perspective of unstructured text, a theme may be one of many central topics discussed in a document. An example of a theme is an issue raised in feedback submitted by a customer.

Theme Detection may refer to a mechanism to scan through a collection of documents, identify various central topics and establish topics that tend to recur across a broad set of independent documents.

Automatic Theme Detection may refer to unsupervised discovery of topics by a machine or computing device.

Unstructured text may refer to documents whose content includes written human language. This may include, but is not limited to, business documents such as word processing documents, spreadsheets etc or transcripts of audio conversations or survey comments or social media posts (e.g. Twitter posts or Facebook posts).

Various embodiments provide a capability to process a set of previously uncategorized documents and discover significant themes. The output of such a process may be a machine developed category model that provides a set of rules to map sentences and/or documents to categories.

Various embodiments may also provide a capability wherein, for a set of documents categorized by a human developed category model, process any sentences that were unmapped to any predefined categories to propose additional categories that enhance the value of the human developed model.

Various embodiments may also provide a capability wherein, for a human or machine developed category model, newly seen documents which remain uncategorized by the model can be processed to discover any new topics of discussion that may have never been seen before.

For an automatically detected theme to be meaningful, one or more of the following characteristics may need to be determined: (a) what happened?—this can include experiences or observations, (b) which entities were affected?—this can include people, location, products, (c) what was (or will be) the impact?.

For an automatically detected theme to be insightful, the theme may need to be tagged with a meaningful descriptor.

For an automatically detected theme to be useful, a set of properties that identify the theme may need to be determined so that such properties can be applied to any future unstructured feedback to determine if the theme is relevant to that feedback as well.

Figure 1:
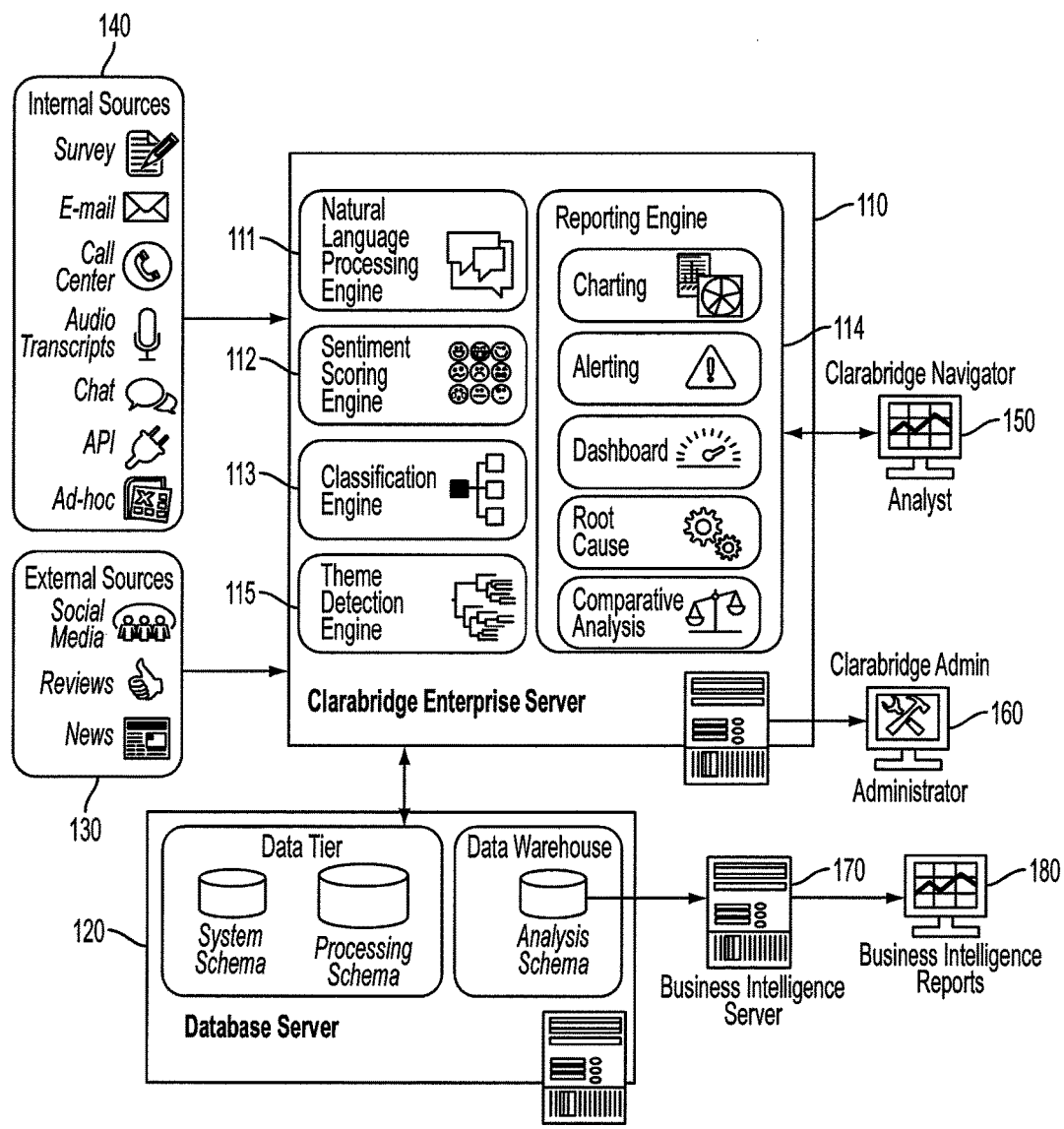
FIG. 1 depicts an exemplary system 100 in accordance with one or more embodiments.

FIG. 1 depicts an exemplary system 100 in accordance with one or more embodiments. System 100 may include enterprise server 110, database server 120, one or more external sources 130, one or more internal sources 140, navigator device 150, administrator device 160, business intelligence server 170, and business intelligence report device 180.

Enterprise server 110, database server 120, one or more external sources 130, one or more internal sources 140, navigator device 150, administrator device 160, business intelligence server 170, and business intelligence report device 180 may be connected through one or more networks. The one or more networks may provide network access, data transport and other services to the devices coupled to it. In general, one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may, again as an alternative or in conjunction with one or more of the above, implement a WiMAX architecture defined by the WiMAX forum. The one or more networks may also comprise, for instance, a local area network (LAN), a wide area network (WAN), the Internet, a virtual LAN (VLAN), an enterprise LAN, a virtual private network (VPN), an enterprise IP network, or any combination thereof.

Enterprise server 110, database server 120, and business intelligence server 170 may be any type of computing device, including but not limited to a personal computer, a server computer, a series of server computers, a mini computer, and a mainframe computer, or combinations thereof. Enterprise server 110, database server 120, and business intelligence server 170 may each be a web server (or a series of servers) running a network operating system, examples of which may include but are not limited to Microsoft Windows Server, Novell NetWare, or Linux.

Enterprise server 110 may include natural processing engine 111, sentiment scoring engine 112, classification engine, 113, reporting engine, 114, and theme detection engine 115.

Natural language processing engine 111 may include subsystems to process unstructured text, including, but not limited to, language detection, sentence parsing, clause detection, tokenization, stemming, part of speech tagging, chunking, and named entity recognition. In some embodiments, natural language processing engine 111 may perform any or all portions of the exemplary process depicted in FIG. 3, which is further discussed below.

Sentiment scoring engine 112 may identify the general feeling, attitude or opinion that the author of a section of unstructured text is expressing towards a situation or event. In some embodiments, the sentiment scoring engine may classify sentiment as either positive, negative or neutral. In some embodiments, the sentiment scoring engine may assign a numeric sentiment score on a numeric scale ranging from a minimum value representing the lowest possible sentiment to a maximum value representing the highest possible sentiment. In some embodiments, a dictionary of words is included, in which selected words are pre-assigned a sentiment tuning value. In some embodiments, the presence or absence of language features such as negation (e.g. NOT GOOD) or modifiers (e.g. VERY GOOD, SOMEWHAT GOOD etc.) when modifying certain words (e.g. GOOD) may influence the computation of sentiment for that sentence or clause.

Classification engine 113 may identify whether a particular classification category applies to a portion of unstructured text. A classification category may refer to a concept that either summarizes a block of unstructured text or may refer to a concept that is being described in a block of unstructured text. Classification categories may include physical objects (e.g. bathroom sink), people (e.g. waitstaff), locations (e.g. lobby), characteristics of objects (e.g. dirty, torn), characteristics of people (e.g. appearance, attitude), perceptions (e.g. unsafe), emotions (e.g. anger) etc. In some embodiments each classification category is represented by one or many rules. In some embodiments, the rules may be expressed in Boolean logic. In some embodiments, the rules may be represented by a trained machine learning model.

Reporting engine 114 may report against categories and sentiment expressed in a collection of documents. In some embodiments, the categories used in reporting may include theme detected topics. In some embodiments, reporting engine 114 may report any or all of the information of the exemplary applications depicted in FIGS. 9-10, which are further discussed below.

Theme detection engine 115 may include subsystems to determine categories/themes within a collection of documents. Theme detection engine 115 may determine categories/themes using unsupervised techniques. In some embodiments, theme detection engine 115 may organize themes in a hierarchical structure in which a child theme may belong to a parent theme. In some embodiments, theme detection engine 115 may suggest one or several categorization rules that represent the concept of the theme such that classification engine 113 may identify whether the theme applies to a portion of unstructured text. In some embodiments, theme detection engine 115 may suggest a name to identify each determined theme. In some embodiments, theme detection engine 115 may perform any or all portions of the exemplary process depicted in FIG. 2, which is further discussed below.

In some embodiments, root cause analysis may be performed with or by any one or more of the embodiments disclosed in co-pending U.S. patent application Ser. No. 13/782,914 filed Mar. 1, 2013, entitled "Apparatus for Identifying Root Cause Using Unstructured Data," which is hereby incorporated herein by reference A user of the system may instruct a module of the system such as theme detection engine 115 to process a collection of unstructured documents to determine significant themes that repeat across the collection.

Figure 2:
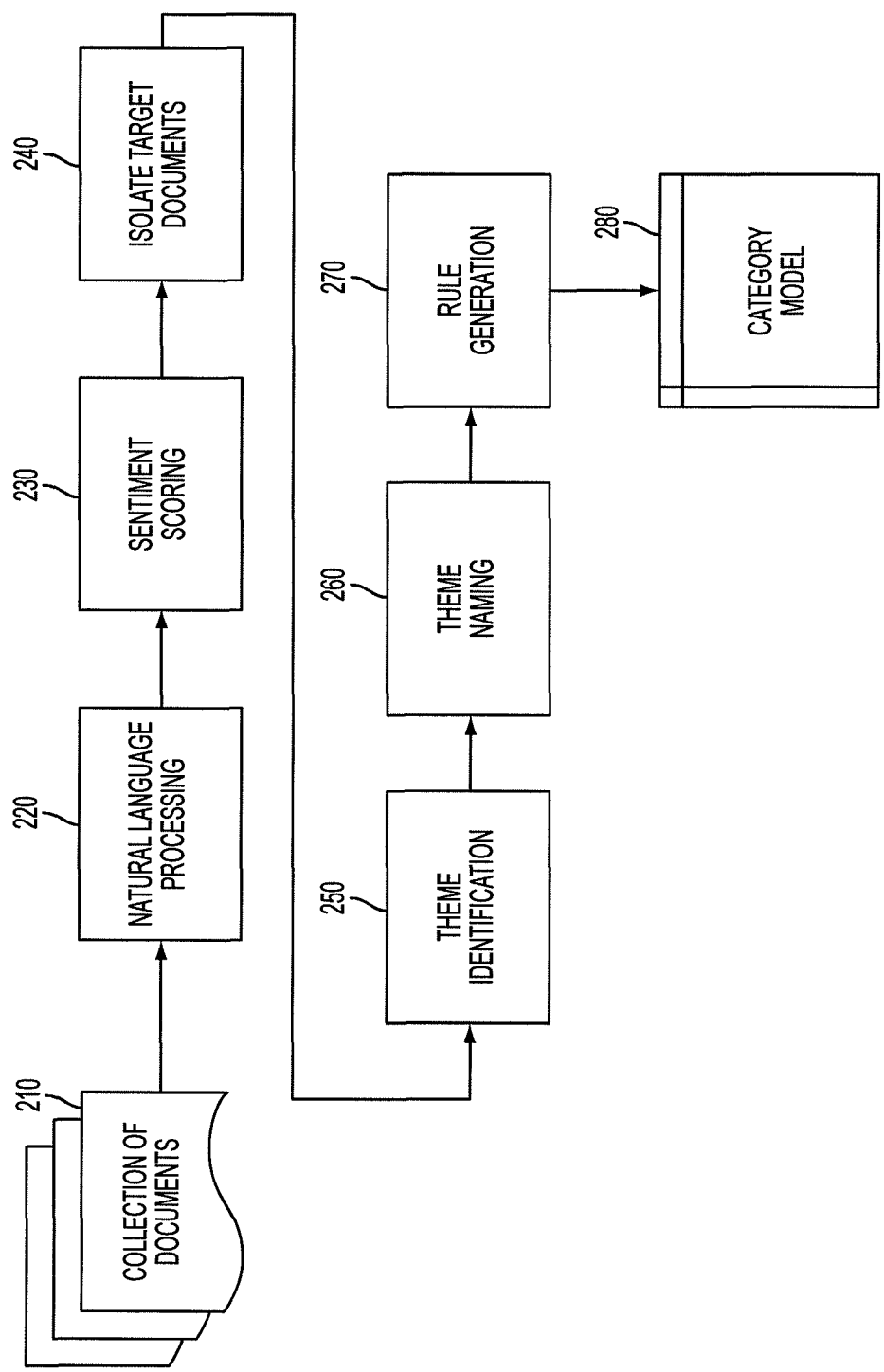
FIG. 2 depicts an exemplary data flow diagram of how data may flow through a system in accordance with one or more embodiments.

FIG. 2 depicts an exemplary data flow diagram 200 of how data may flow through a system in accordance with one or more embodiments. Data flow diagram 200 may include receiving collection of documents 210, natural language processing 220, sentiment scoring 230, isolating target documents 240, theme identification 250, naming of themes 260, generation of rules to capture such themes 270, and generation of a category model 280.

Receiving collection of documents 210 may include collecting unstructured text documents from one or more internal sources and/or external sources. An internal source may refer to unstructured text that originates from within an organization. Internal sources may include, but not be limited to, e-mail, call center notes, transcripts of audio conversations, chat conversations, word documents, excel documents, and databases. External sources may refer to publicly available unstructured data or unstructured data that is published on a system external to an organization. External sources may include, but not be limited to, social media sources such as Facebook, Twitter, product review sites, service review sites, business review sites, and news sources. In some embodiments, unstructured text documents may be temporarily staged in a file-system or a database during the data collection process.

Natural language processing 220 may include methods to process unstructured text, including, but not limited to, language detection, sentence parsing, clause detection, tokenization, stemming, part of speech tagging, chunking and named entity recognition. In some embodiments, natural language processing 220 may include any or all portions of the exemplary process depicted in FIG. 3 which is further discussed below.

Sentiment scoring 230 may include methods to identify the general feeling, attitude or opinion that the author of a section of unstructured text is expressing towards a situation or event. In some embodiments, the sentiment scoring engine may classify sentiment as either positive, negative or neutral. In some embodiments, the sentiment scoring engine may assign a numeric sentiment score on a numeric scale ranging from a minimum value representing the lowest possible sentiment to a maximum value representing the highest possible sentiment.

In some embodiments, if a sentence has a single sentiment word with no negators or modifiers, the sentence sentiment score will be equal to the sentiment of that word (For example, a single word with a sentiment value of +3 will result in a sentence sentiment score of +3). In some embodiments, for sentences with multiple sentiment words, the following calculation is applied. Consider the sentence below as an example:

| The room was | | | |
| --- | --- | --- | --- |
| exceptionally clean, | very spacious, | nicely decorated and | inexpensive. |
| +3 | +3 | +2 | +1 |

1. Find the highest sentiment word value in the sentence. This will be used as a base for the sentence sentiment. In the example sentence this is +3.
2. Add +0.5 for every additional word with the same sentiment. In the example, there is one more word with +3 so add +3 and +0.5 which equals to +3.5
3. Add +0.25 for every word one level lower in sentiment. In the example, there is just one token with +2, so (3.5+0.25)=+3.75
4. The same approach is applicable for each subsequent levels. For sentiment level n−1 take the value of individual token on the level n and divide by 2 and then multiply by number of tokens with sentiment (n−1). So, in the example to calculate the effect of +1 token you have add +0.25/2 to the sentence sentiment: (3.75+0.25/2)=3.875. The only exception is that word sentiment level 0.25 (multiple decreasing modifiers attached to the word with a +1 or −1 value) is handled the same way as 0.5—the net effect for the sentence sentiment will be the same for both levels as there is no meaningful difference between the two cases.

5. Total sentence sentiment=+3.875

The same calculation model is used for a sentence with negative words: adding a negative value equals subtraction of this value. When a sentence contains both positive and negative words, the calculations are done separately for positive and negative parts and then summed up.

Isolating target documents 240 may include steps to determine a collection of documents that theme identification 250 may process. In some embodiments, isolating target documents 240 may include steps to randomly sample a set of documents from the original document collection if the original document collection size is larger than a threshold. In some embodiments, isolating target documents 240 may include steps to reject duplicate documents from the sampled set of documents. In some embodiments, isolating target documents 240 may include steps to apply a criteria for selecting documents, which theme identification 250 may process, using a user specified document filter criteria. In some embodiments, isolating target documents 240 may perform any or all portions of the exemplary processes depicted in FIG. 4, FIG. 5, FIG. 6 and FIG. 7, which are further discussed below.

Theme identification 250 may include steps to statistically determine themes from isolated target documents 240 using natural language features identified using natural language process 220 including but not limited to stemmed words, named entities, bigrams and part-of-speech. In some embodiments, theme identification 250 may include steps to identify themes as a single or multi-level hierarchy with parent themes and child themes. In some embodiments, theme identification 250 may include any or all portions of the exemplary process depicted in FIG. 8, which is further discussed below.

Theme naming 260 may name one or more themes produced by theme identification. Theme naming 260 may provide a theme with a label that allows a person viewing the label to understand what concept the theme describes.

Rule generation 270 may generate rules that are text patterns that can be used to categorize a block of unstructured text such that if a block of text matches the pattern, the theme can be said to describe a concept in the block of text.

Category model 280 may represent a hierarchical structure of themes.

Figure 3:
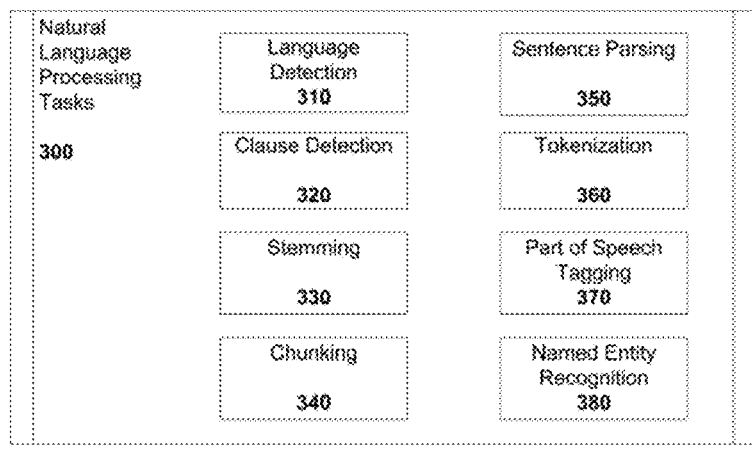
FIG. 3 depicts exemplary natural language processing modules 300 in accordance with one or more embodiments.

FIG. 3 depicts exemplary natural language processing modules 300 in accordance with one or more embodiments.

Language detection 310 may include steps to identify the human language used to create the specific document being processed. In some embodiments, language detection may be performed by testing for high frequency words found in particular languages (e.g. "the", "we", "my" etc. in English). In some embodiments, language detection may be performed by identifying frequent N-grams, which are sequences of word patterns, from the document and searching against a corpus. In some embodiments, language detection may be performed based on the Unicode characters used in the document which may be unique to a particular language.

Sentence parsing 350 may include steps to identify sentences within the specific document being processed and to determine a parse structure that represents different grammatical relationships within each sentence identified. For example the sentence "The bathroom was dirty" may be parsed as:

(S (NP the bathroom)
  (VP was
    (ADJP dirty)))

where S refers to sentence, NP refers to noun phrase "the bathroom", VP refers to verb phrase "was dirty", ADJP refers to adjective phrase "dirty".

Clause detection 320 may include steps to identify clauses within sentences identified in sentence parsing 350. For example the sentence "The bathroom was dirty and the carpet was torn" may be parsed as:

(S (S (NP the bathroom)
    (VP was
      (ADJP dirty)))
  and
  (S (NP the carpet)
    (VP was
      (ADJP torn))))

where two independent clauses "the bathroom was dirty" and "the carpet was torn" may be separated for analysis without losing any semantic meaning.

Tokenization 360 may include steps to identify each word within sentences identified in sentence parsing 350. For example the sentence "The bathroom was dirty" may be tokenized into the words THE, BATHROOM, WAS, DIRTY.

Stemming 330 may include steps to strip each word of any morphological suffixes or prefixes so that the word can be reduced to its root form. For example the token RUDELY may be stemmed to RUDE so that a single concept called RUDE can be identified.

Named entity recognition 380 may include steps to identify and relate proper nouns within a document collection. For example the token EL PASO may be identified as a named entity of type location.

Part of speech 370 may include steps to identify the grammatical function performed by each word within a sentence. Grammatical functions performed by words may include but are not limited to, noun, verb, adjective, adverb, pronoun, preposition. For example in the sentence "the bathroom was dirty" may identify speech parts as THE=determiner, BATHROOM=noun, WAS=verb, DIRTY=adjective.

Chunking 340 may include steps to group sequential nouns together as a single consolidated noun token, if the multiple tokens are deemed more meaningful when grouped together as compared to when separated. In some embodiments, the determination that a group of tokens is more meaningful when grouped together may be accomplished using a lexicon dictionary or using a statistical calculation. An example would be neighboring tokens MICKEY and MOUSE which would be more meaningful as a combined token MICKEY MOUSE.

Figure 4:
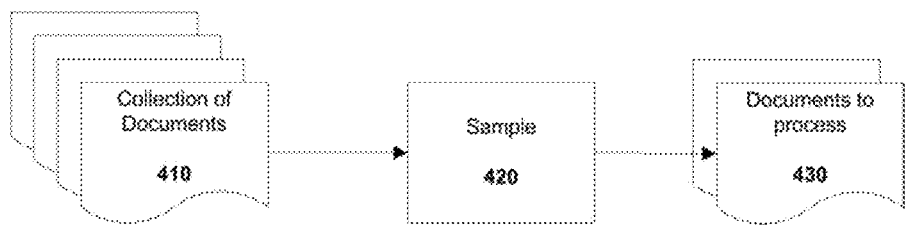
FIG. 4 depicts an exemplary process flow diagram to determine a set of documents against which theme detection is run in accordance with one or more embodiments.

FIG. 4 depicts an exemplary process flow diagram 400 to determine a set of documents against which theme detection is run in accordance with one or more embodiments. In process flow diagram 400, a document collection may be sampled using a random sampling algorithm when given a very large collection of unstructured data.

Receiving collection of documents 410 may include steps to collect unstructured text documents from one or more internal sources, such as but not limited to e-mail, call center notes, transcripts of audio conversations, chat conversations, word documents, excel documents, and databases, and/or one or more external sources, such as but not limited to social media sources such as Facebook, Twitter, product review sites, service review sites, business review sites, and news sources. In some embodiments, unstructured text documents may be temporarily staged in a file-system or a database during the data collection process.

In block 420, the documents from 410 may be sampled. Sampling may include steps to sample from a large collection of documents. The sampling may be performed randomly.

Documents to process 430 may represent the result of the sampling process 420.

Figure 5:
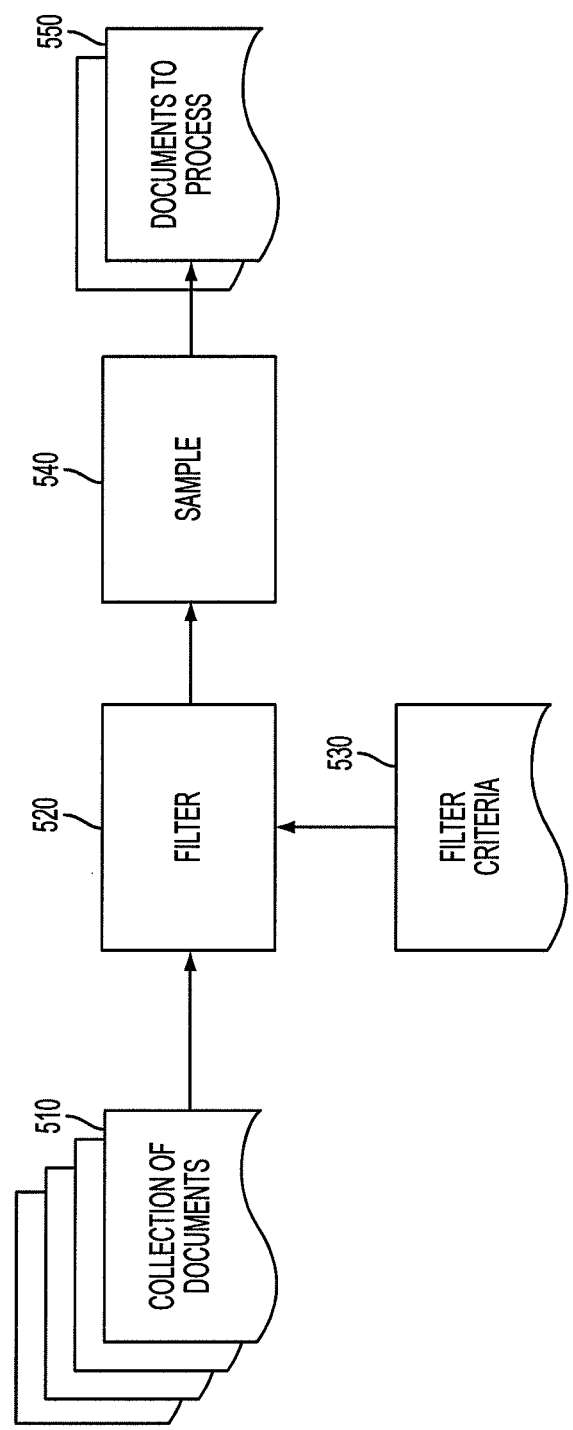
FIG. 5 depicts an exemplary process flow diagram to determine a set of documents against which theme detection is run in accordance with one or more embodiments.

FIG. 5 depicts an exemplary process flow diagram 500 to determine a set of documents against which theme detection is run in accordance with one or more embodiments. In process flow diagram 500, filtering criteria may be used to restrict the documents processed for automatic theme detection using but not limited to filter criteria based on document metadata (i.e. structured data attributes associated with each unstructured document), filter criteria based on text patterns within unstructured text, or combination of several filter criteria against document metadata or text patterns. Applying filter criteria may include using Boolean logic.

Receiving collection of documents 510 may include steps to collect unstructured text documents from one or more internal sources, such as but not limited to e-mail, call center notes, transcripts of audio conversations, chat conversations, word documents, excel documents, and databases, and/or one or more external sources, such as but not limited to social media sources such as Facebook, Twitter, product review sites, service review sites, business review sites, and news sources. In some embodiments, unstructured text documents may be temporarily staged in a file-system or a database during the data collection process.

Filter criteria 530 may include filter criteria based on document metadata (i.e. structured data attributes associated with each unstructured document), filter criteria based on text patterns within unstructured text, or combination of several filter criteria against document metadata or text patterns. Applying filter criteria may include using Boolean logic.

Filter 520 may include steps to capture documents out of collection of documents 510 such that the documents fit any criteria specified in filter criteria 530.

Sample 540 may include steps to sample from a large collection of documents. The sampling may be performed randomly.

Documents to process 550 may include the result of the sampling process 540.

Figure 6:
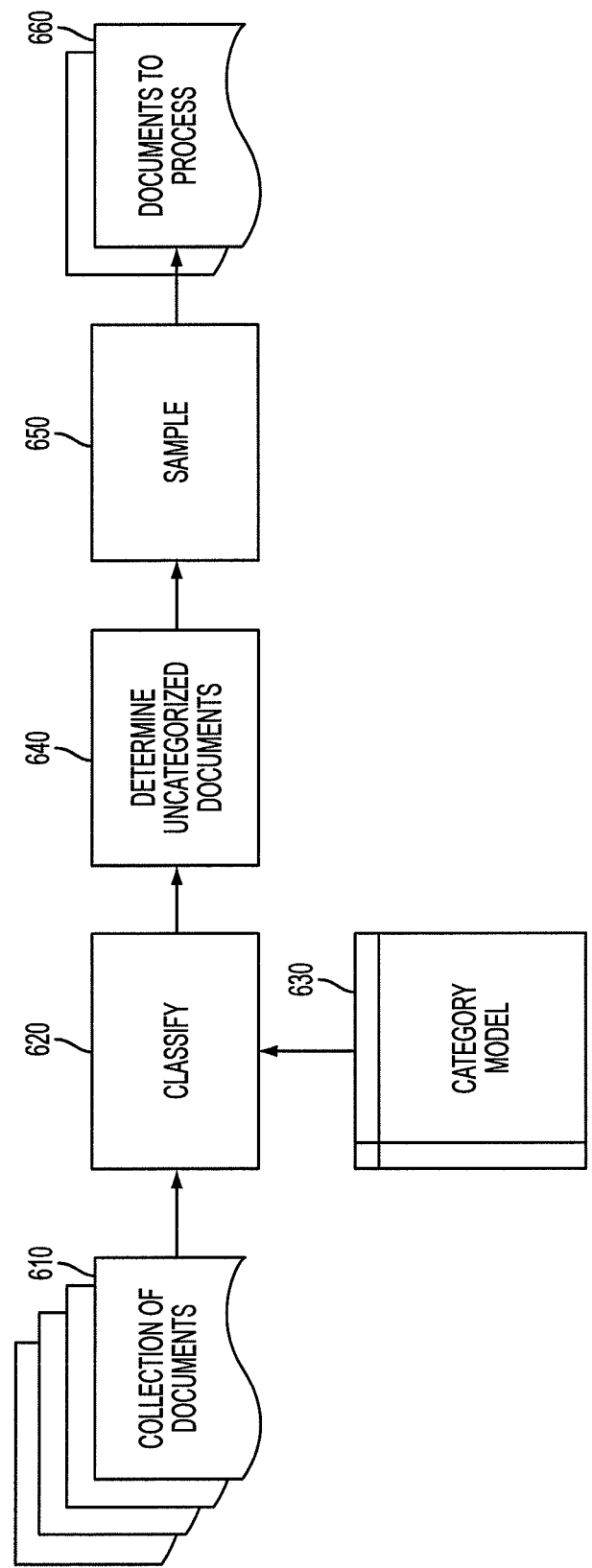
FIG. 6 depicts an exemplary process flow diagram to determine a set of documents against which theme detection is run in accordance with one or more embodiments.

FIG. 6 depicts an exemplary process flow diagram 600 to determine a set of documents against which theme detection is run in accordance with one or more embodiments. In process flow diagram 600, the documents to be processed for automatic theme detection may be determined by identifying such documents that remain unclassified when applying a previously created classification model to the document collection. Such a process may be used at least, for example, when the goal of the process is to identify such categories that may have been overlooked by a human while developing a category model.

Receiving collection of documents 610 may include steps to collect unstructured text documents from one or more internal sources, such as but not limited to e-mail, call center notes, transcripts of audio conversations, chat conversations, word documents, excel documents, and databases, and/or one or more external sources, such as but not limited to social media sources such as Facebook, Twitter, product review sites, service review sites, business review sites, and news sources. In some embodiments, unstructured text documents may be temporarily staged in a file-system or a database during the data collection process.

Category model 630 may include a collection of categories such that for each category in the collection, one or many rules are specified that provide instructions for mapping a document to that category if the rules are satisfied by the document.

Classify 620 may include steps to apply category model 630 to collection of documents 610 so that documents are mapped to a category within model 630 if the document contains a text pattern defined by a rule for the category.

Determine uncategorized documents 640 may include steps to identify those documents from classify 620 that remain unclassified. Unclassified documents may refer to documents for which no category exists whose rules match the content of such uncategorized documents.

Sample 650 may include steps to sample from a large collection of documents. The sampling may be performed randomly.

Documents to process 660 may include the result of the sampling process 650.

Figure 7:
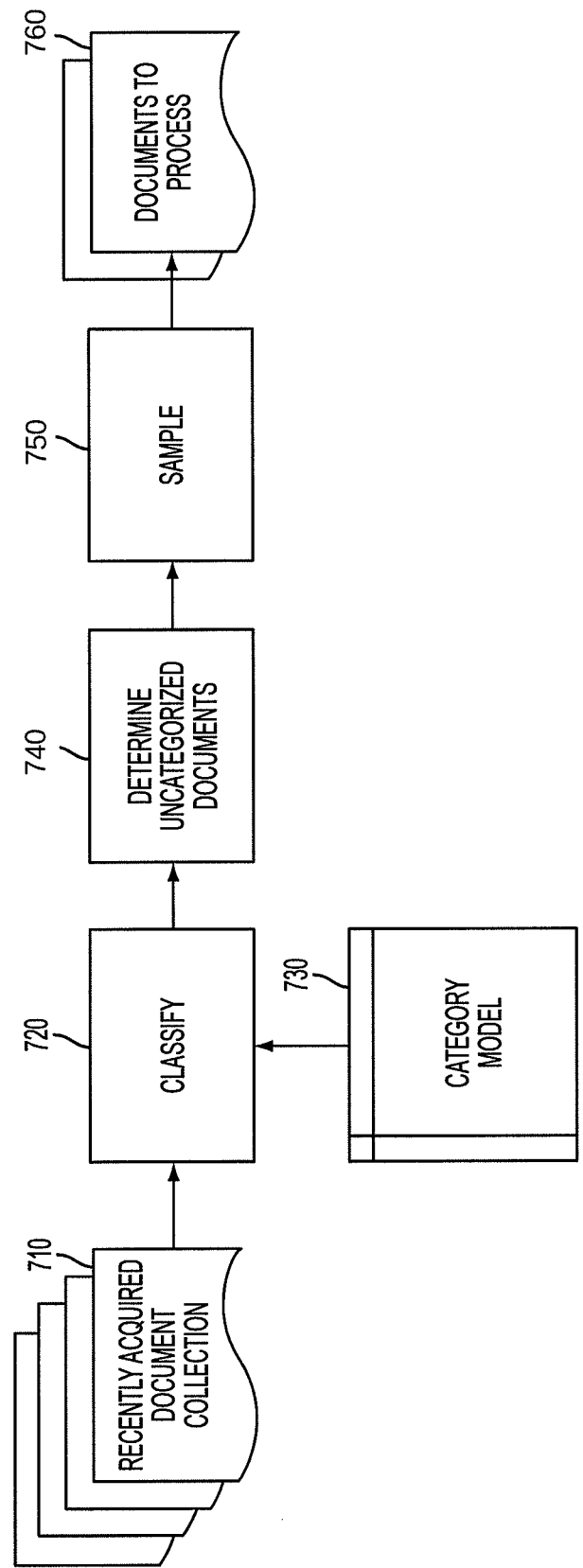
FIG. 7 depicts an exemplary process flow diagram to determine a set of documents against which theme detection is run in accordance with one or more embodiments.

FIG. 7 depicts an exemplary process flow diagram to determine a set of documents against which theme detection is run in accordance with one or more embodiments. In process flow diagram 700, the documents to be processed for theme detection may be determined by identifying such documents that remain unclassified when applying a previously created classification model to a specific document harvest. Such a process may be used at least, for example, when the goal of the process is to identify new categories that may have never been previously seen.

Receiving collection of documents 710 may include steps to collect unstructured text documents from one or more internal sources, such as but not limited to e-mail, call center notes, transcripts of audio conversations, chat conversations, word documents, excel documents, and databases, and/or one or more external sources, such as but not limited to social media sources such as Facebook, Twitter, product review sites, service review sites, business review sites, and news sources. In some embodiments, unstructured text documents may be temporarily staged in a file-system or a database during the data collection process. In some embodiments, the documents received represents only documents acquired in the current collection process. Category model 730 may represent a collection of categories such that for each category in the collection, one or many rules are specified that provide instructions for mapping a document to that category if the rules are satisfied by the document.

Classify 720 may include steps to apply category model 730 to collection of documents 710 so that documents are appropriately categorized Determine uncategorized documents 740 may include steps to identify those documents from classify 720 that remain unclassified. Unclassified documents may refer to documents for which no category exists whose rules match the content of such uncategorized documents.

Sample 750 may include steps to sample from a large collection of documents. The sampling may be performed randomly.

Documents to process 760 may represent the result of the sampling process 750.

Figure 8:
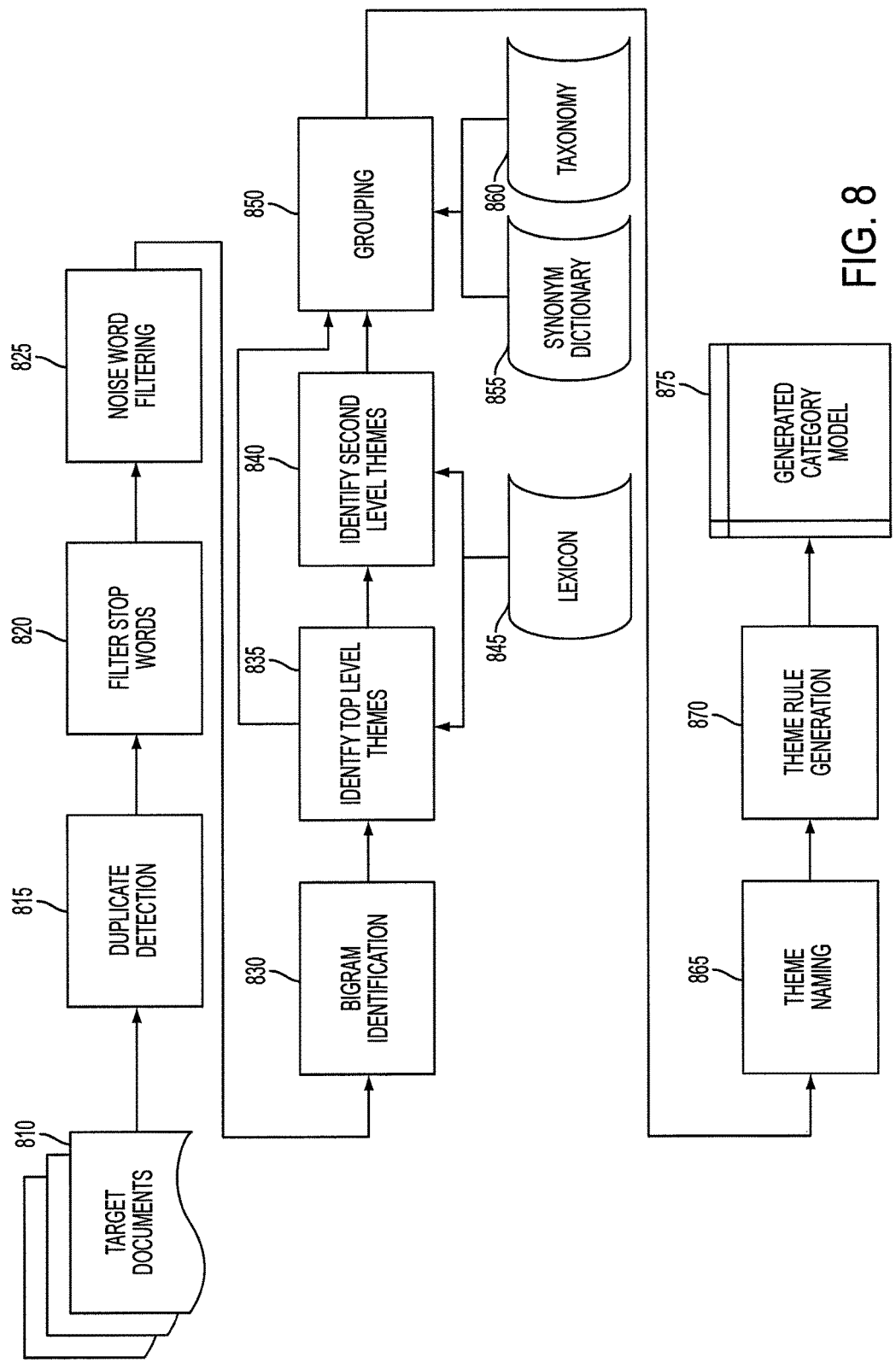
FIG. 8 depicts an exemplary process flow diagram to identify themes in accordance with one or more embodiments.

FIG. 8 depicts an exemplary process flow diagram 800 to identify themes in accordance with one or more embodiments. Process flow diagram 800 may include receiving target documents 810, duplicate detection 815, filter stop words 820, noise word filtering 825, bigram identification 830, identify top level themes 835, identify second level themes 840, grouping 850, lexicon dictionary 845, synonym dictionary 855, taxonomy 860, theme naming 865, theme rule generation 870, generated category model 875.

Receiving target documents 810 may include may include steps to collect unstructured text documents from one or more internal sources, such as but not limited to e-mail, call center notes, transcripts of audio conversations, chat conversations, word documents, excel documents, and databases, and/or one or more external sources, such as but not limited to social media sources such as Facebook, Twitter, product review sites, service review sites, business review sites, and news sources. In some embodiments, unstructured text documents may be temporarily staged in a file-system or a database during the data collection process. In some embodiments, the document collection may be sampled as depicted in FIG. 4. In some embodiments, the document collection may be filtered as depicted in FIG. 5. In some embodiments, the document collection may be restricted to unclassified documents from a prior document categorization step as depicted in FIG. 6. In some embodiments, the document collection may be restricted to recently acquired unclassified documents from a prior document categorization step as depicted in FIG. 7.

Duplicate detection 815 may include steps to identify duplicate content amongst the document collection being processed. This may be to prevent spam content and other non-meaningful repetitive content such as advertisements, reposts of popular topics etc from creating an unwanted bias in the results. In some embodiments, duplicate detection 810 may be performed by computing a mathematical hash computation of each document and selecting only one instance of cases where different documents return the same hash value.

Filter stop words 820 may include steps to remove high frequency words commonly found in language such as determiners, copula, auxiliary verbs etc. In some embodiments filter stop words 820 may be performed by using a predefined list of high frequency words. In some embodiments filter stop words 820 may be performed by mathematically computing a frequency threshold; words with a frequency above the threshold may be removed from further processing.

Noise word filtering 825 may include steps to remove noise words in the documents from consideration, such that the noise words may be ignored. Data sourced from social media is generally noisy. An example is if data is sourced using a search criteria, the search term(s) tends to repeat very frequently and may be mistaken for a theme.

In some embodiments, noise word filtering 820 may determine a set of noise words N using the following technique. A word w may considered to be a noise word if the following heuristic criteria are met:

$$w \in N \Longleftrightarrow \left\{ \left[ \frac{|\{s \mid s \in S, w \in s\}|}{|S|} > 0.5 \right] \mid \left[ \begin{array}{c} \frac{|\{s \mid s \in S, w \in s\}|}{|S|} > 0.1 \wedge \\ |\{s \mid s \in S, w \in s\}| > (\overline{S_{100}} + 2.5 \; std(S_{100})) \wedge \\ slope(\{(10, slope(S_{10}), (20, slope(S_{20}), (40, slope(S_{40}), (80, slope(S_{80})))\}) > 2 \end{array} \right] \right\}$$

where
|{ . . . }| represents the count of all elements in a set
| represents logical OR
^ represents logical AND $$\left[ \frac{|\{s \mid s \in S, w \in s\}|}{|S|} > 0.5 \right]$$

is true if the word w is found in more than half of the collection of documents S. Such words are discarded as likely noise words $$\frac{|\{s \mid s \in S, w \in s\}|}{|S|} > 0.1$$

is true if the word w is found in more than 10% of the collection of documents S. (CRITERIA 1)

$\overline{S_{100}}$ represents average word frequency of the 100 most frequent words std($S_{100}$) represents the standard deviation in word frequency of the 100 most frequent words.

|{s|s∈s,w∈s}|>($\overline{S_{100}}$+2.5 std($S_{100}$)) is true if the word w has a frequency that is outside 2.5 standard deviations of the frequency of the top 100 most frequent words—i.e. the word is an outlier. (CRITERIA 2)

slope($S_{10}$) represents the statistical slope of the 10 most frequent words slope($S_{20}$) represents the statistical slope of the 20 most frequent words slope ($S_{40}$) represents the statistical slope of the 40 most frequent words slope($S_{80}$) represents the statistical slope of the 80 most frequent words slope({(10,slope($S_{10}$),(20,slope($S_{20}$),(40,slope ($S_{40}$),(80, slope($S_{80}$)))}) is a measure of how peaked the distribution graph is for the 80 most frequent words. If the top most frequent words are significantly more frequent than the remainder of 80 most frequent words and CRITERIA1 and CRITERIA2 are also met, then it is possibly that the words in the "peak" are from a search query used in harvesting the document set.

All words in the set N may be ignored. An example of noise words would be when a search query is issued against a source such as "LCD TV". Given the nature of the query, the most frequent terms are likely to be LCD and TV—in order to filter such terms out an approach such as the one described above may be applied. Bigram identification 830 may include steps to identify two sequential tokens as a single logical unit. In some embodiments, bigram identification 830 may identify bigrams using the following steps:

Identify all possible ordered pair of two words which co-located in at least 2 sentences Given an ordered word pair <L,R>, compute the probability that word R occurs to right of word L using Bayes law:

$$P(<L, R> | L) = \frac{|\{s \mid s \in S, <L, R> \in s\}|}{|\{s \mid s \in S, L \in s\}|}$$

where

S represents the set of all sentences being processed $|\{\ldots\}|$ represents the count of all elements in a set $|\{s | s \in S, <L,R> \in s\}|$ represents a count of all instances where word R is to the immediate right of word L.

$|\{s | s \in S, L \in S\}|$ represents a count of all instances where word L is used.

A higher value for P(<L,R>|L) indicates that it is more likely that LR is a bigram since whenever word L is found, it is very commonly found to the left of word R.

Given an ordered word pair <L,R>, compute the probability that word L occurs to right of word R using Bayes law:

$$P(<L, R> | R) = \frac{|\{s \mid s \in S, <L, R> \in s\}|}{|\{s \mid s \in S, R \in s\}|}$$

where

S represents the set of all sentences being processed $|\{\ldots\}|$ represents the count of all elements in a set $|\{s|s \in S, <L,R> \in s\}|$ represents a count of all instances where word R is to the immediate right of word L.

$|\{s|s \in S, R \in s\}|$ represents a count of all instances where word R is used. A higher value for P(<L, R>|R) indicates that it is more likely that LR is a bigram since whenever word R is found, it is very commonly found to the right of word L.

Determine a set of bigrams B. An ordered word pair <L,R> is considered to be an bigram if the following heuristic criteria are met:

$$<L, R> \in B \iff \left(\left[P(<L, R> | L) > 0.7 \wedge (P(<L, R> | R) > 0.1 \wedge \frac{|\{s \mid s \in S, <L, R> \in s\}|}{|S|} > 0.0002\right]\right.$$

$$\left[P(<L, R> | L) > 0.1 \wedge (P(<L, R> | R) > 0.7 \wedge \frac{|\{s \mid s \in S, <L, R> \in s\}|}{|S|} > 0.0002\right]|$$

$$\left[P(<L, R> | L) > 0.5 \wedge (P(<L, R> | R) > 0.1 \wedge \frac{|\{s \mid s \in S, <L, R> \in s\}|}{|S|} > 0.0005\right]|$$

$$\left[P(<L, R> | L) > 0.1 \wedge (P(<L, R> | R) > 0.5 \wedge \frac{|\{s \mid s \in S, <L, R> \in s\}|}{|S|} > 0.0005\right]|$$

$$\left[P(<L, R> | L) > 0.3 \wedge (P(<L, R> | R) > 0.1 \wedge \frac{|\{s \mid s \in S, <L, R> \in s\}|}{|S|} > 0.002\right]|$$

$$\left[P(<L, R> | L) > 0.1 \wedge (P(<L, R> | R) > 0.3 \wedge \frac{|\{s \mid s \in S, <L, R> \in s\}|}{|S|} > 0.002\right]|$$

$$\begin{bmatrix} |\{s \mid s \in S, <L, R> \in s\}| > 10 \wedge |\{s \mid s \in S, <R, L> \in s\}| = 0 \wedge \\ PoS(L) = \text{'Adjective'} \wedge PoS(R) = \text{'Noun'} \end{bmatrix}|$$

$$\begin{bmatrix} |\{s \mid s \in S, <L, R> \in s\}| > 10 \wedge |\{s \mid s \in S, <R, L> \in s\}| = 0 \wedge \\ PoS(L) = \text{'Noun'} \wedge PoS(R) = \text{'Adjective'} \end{bmatrix}|$$

$$\begin{bmatrix} |\{s \mid s \in S, <L, R> \in s\}| > 10 \wedge |\{s \mid s \in S, <R, L> \in s\}| = 0 \wedge \\ PoS(L) = \text{'Noun'} \wedge PoS(R) = \text{'Noun'} \end{bmatrix}|$$

$$\left.\begin{bmatrix} |\{s \mid s \in S, <L, R> \in s\}| > 10 \wedge |\{s \mid s \in S, <R, L> \in s\}| = 0 \wedge \\ PoS(L) = \text{'Adjective'} \wedge PoS(R) = \text{'Adjective'} \end{bmatrix}\right)$$

where
| represents logical OR
^ represents logical AND $$\frac{|\{s \mid s \in S, <L, R> \in s\}|}{|S|} > 0.0002$$

is true if the word pair LR is found in more than 0.02% of sentences (CRITERIA3)

$$\left[ P(<L, R> \mid L) > 0.7 \wedge (P(<L, R> \mid R) > 0.1 \wedge \frac{|s\{s \in S, <L, R> \in s\}|}{|S|} > 0.0002 \right]$$

is true if CRITERIA3 is met and word L displays an tendency to be found always to the left of R $$\left[ P(<L, R> \mid L) > 0.1 \wedge (P(<L, R> \mid R) > 0.7 \wedge \frac{|\{s \mid s \in S, L, R> \in s\}|}{|S|} > 0.0002 \right]$$

is true if CRITERIA3 is met and word R displays an tendency to be found always to the right of L $$\frac{|\{s \mid s \in S, \langle L, R \rangle \in s\}|}{|S|} > 0.0005$$

is true if the word pair LR is found in more than 0.05% of sentences (CRITERIA4)

$$\left[ P(\langle L, R \rangle \mid L) > 0.05 \wedge (P(\langle L, R \rangle \mid R) > 0.1 \wedge \frac{|\{s \mid s \in S, \langle L, R \rangle \in s\}|}{|S|} > 0.0005 \right]$$

is true if CRITERIA4 is met and word L displays an tendency to be found always to the left of R $$\left[ P(\langle L, R \rangle \mid L) > 0.1 \wedge (P(\langle L, R \rangle \mid R) > 0.5 \wedge \frac{|\{s \mid s \in S, \langle L, R \rangle \in s\}|}{|S|} > 0.0005 \right]$$

is true if CRITERIA4 is met and word R displays an tendency to be found always to the right of L $$\frac{|\{s \mid s \in S, \langle L, R \rangle \in s\}|}{|S|} > 0.002$$

is true if the word pair LR is found in more than 0.2% of sentences (CRITERIA5)

$$\left[ P(\langle L, R \rangle \mid L) > 0.3 \wedge (P(\langle L, R \rangle \mid R) > 0.1 \wedge \frac{|\{s \mid s \in S, \langle L, R \rangle \in s\}|}{|S|} > 0.002 \right]$$

is true if CRITERIA5 is met and word L displays an tendency to be found always to the left of R $$\left[ P(\langle L, R \rangle \mid L) > 0.1 \wedge (P(\langle L, R \rangle \mid R) > 0.3 \wedge \frac{|\{s \mid s \in S, \langle L, R \rangle \in s\}|}{|S|} > 0.002 \right]$$

is true if CRITERIA5 is met and word R displays an tendency to be found always to the right of L
PoS( . . . ) represents the part of speech from part of speech tagging 370

$$\left[ \begin{array}{c} |\{s \mid s \in S, \langle L, R \rangle \in s\}| > 10 \wedge |\{s \mid s \in S, \langle L, R \rangle \in s\}| = 0 \wedge \\ PoS(L) = \text{'Adjective'} \wedge PoS(R) = \text{'Noun'} \end{array} \right]$$

is true if there exists an Adjective L and Noun R such that the pair LR is seen more than 10 times and the bigram RL is never seen. This check is done for languages such as English where adjectives frequently are found just before the noun they modify.

$$\left[ \begin{array}{c} |\{s \mid s \in S, \langle L, R \rangle \in s\}| > 10 \wedge |\{s \mid s \in S, \langle L, R \rangle \in s\}| = 0 \wedge \\ PoS(L) = \text{'Noun'} \wedge PoS(R) = \text{'Adjective'} \end{array} \right]$$

is true if there exists an Noun L and Adjective R such that the pair LR is seen more than 10 times and the bigram RL is never seen. This check is done for languages where adjectives frequently are found just after the noun they modify.

$$\left[ \begin{array}{c} |\{s \mid s \in S, \langle L, R \rangle \in s\}| > 10 \wedge |\{s \mid s \in S, \langle L, R \rangle \in s\}| = 0 \wedge \\ PoS(L) = \text{'Noun'} \wedge PoS(R) = \text{'Noun'} \end{array} \right]$$

is true if there exists an Noun L and Noun R such that the pair LR is seen more than 10 times and the bigram RL is never seen. This check is done for terms such as MICKEY MOUSE—since the reverse order MOUSE MICKEY is less frequently found.

$$\left[ \begin{array}{c} |\{s \mid s \in S, \langle L, R \rangle \in s\}| > 10 \wedge |\{s \mid s \in S, \langle L, R \rangle \in s\}| = 0 \wedge \\ PoS(L) = \text{'Adjective'} \wedge PoS(R) = \text{'Adjective'} \end{array} \right]$$

is true if there exists an Adjective L and Adjective R such that the pair LR is seen more than 10 times and the bigram RL is never seen.
Bigram identification 830 may assign a part of speech to a bigram using the following logic applied in sequence:
  If one of the words in the bigram is a Noun, consider the bigram to be a Noun
  If one of the words in the bigram is a Verb, consider the bigram to be a Verb
  If both words in the bigram are Adjectives, consider the bigram to be an Adjective
  If no other criteria is met, then assign the part of speech of the right-most word as the bigram part of speech
An example would be neighboring tokens WATER and PARK which would be more meaningful as a combined token WATER PARK.
Themes may be identified into a one-level or a two-level hierarchy. Identify top level themes 835 may include steps where top level themes of a two-level hierarchy are identified or where themes of a one level-hierarchy are identified. In some embodiments, this step may be performed using the following steps:

Calculation of overall sentiment distribution using formula:

$$P(\text{Sentiment}) = \frac{|\{s \mid s \in S, \text{sentiment}(s) <> 0\}|}{|S|}$$

where
- sentiment(s) represents the sentiment score assigned to the sentence, may be the result from sentiment scoring 230.
- $|\{s|s \in S, \text{sentiment}(s)< >0\}|$ represents a count of sentences that have a non-zero sentiment value
- $|S|$ represents the total count of sentences Calculation of sentiment distribution for sentences containing word w using formula:

$$P(\text{Sentiment}| w) = \frac{|\{s \mid s \in S, w \in s, \text{sentiment}(s) <> 0\}|}{|\{s \mid s \in S, w \in s\}|}$$

where
- sentiment(s) represents the sentiment score assigned to the sentence, may be the result from sentiment scoring 230.
- $|\{s|s \in S, w \in s, \text{sentiment}(s)< >0\}|$ represents a count of sentences that contain word w that have a non-zero sentiment value
- $|\{s|s \in S, w \in s\}|$ represents the total count of sentences that contain word w A lexicon of words 845 identifying whether a word has a bias towards positive or negative sentiment A word or bigram w may be a candidate for a top level theme if it meets the following criteria:

$$\frac{|\{s \mid s \in S, w \in s\}|}{|S|} > 0.0002 \wedge$$

$$([PoS(w) = \text{'Noun'} \wedge P(\text{Sentiment}| w) > P(\text{Sentiment}) \wedge \text{sentiment}(w) = 0] \mid [PoS(w) = \text{'Verb'} \wedge P(\text{Sentiment}| w) >$$

$$P(\text{Sentiment}) \wedge \text{sentiment}(w) <> 0] \mid [w \in NE])$$

where
- | represents logical OR
- ^ represents logical AND
- PoS( . . . ) represents the part of speech from part of speech tagging 370 sentiment(w) represents the sentiment assigned to the word or bigram in the lexicon. If no entry is found in the lexicon, sentiment(w)=0.

$$\frac{|\{s \mid s \in S, w \in s\}|}{|S|} > 0.0002$$

is true if the word w is found in more than 0.02% of sentences. This check is so that very infrequent terms do not get selected as themes. (CRITERIA6)

[PoS(w)='Noun'^P(Sentiment|w)>P(Sentiment)
^sentiment(w)=0] is true if a word is a Noun that does not bear sentiment and the word displays an inclination to be found more in sentiment bearing sentences. Such words are selected as themes if CRITERIA6 is also met.

[PoS(w)='Verb'^P(Sentiment|w)>P(Sentiment)
^sentiment (w)<>0] is true if a word is a Verb that bears sentiment and the word displays an inclination to be found more in sentiment bearing sentences. Such words are selected as themes if CRITERIA6 is also met.

NE represents the set of Named Entities—all named entities are considered to be relevant themes. Such words are selected as themes if CRITERIA6 is also met.

From this list of candidates, a culling exercise is done following the steps below:
- Identify the second most frequent candidate
- Set a cutoff threshold as (count of sentences for second most frequent candidate/5)
- Ignore any candidates which occur less than the cutoff threshold In some embodiments, Top-level themes may be identified by from the pool of words and bigrams. An overall sentiment distribution of a group of sentences may be calculated and an item sentiment distribution for sentences containing each item in the pool may be calculated. An item from the pool may be a candidate for a top-level theme if (1) it appears above a certain threshold in the set of documents and (2) it is:

(a) a noun having a word sentiment probability is greater than the overall sentiment distribution probability and the sentiment of the word is neutral;

(b) a verb having a word sentiment probability is greater than the overall sentiment distribution probability and the sentiment of the word is not neutral; or (c) is a named entity.

In some embodiments, the identified candidates may be culled by identifying the second most frequent candidate, setting a cutoff threshold as a count of sentences for the second most frequent candidate divided by a value, and ignoring any candidate which occur less than the cutoff threshold.

Identify second level themes 840 may include steps in which one or more second level themes of a two-level hierarchy may be identified. This step is may not necessarily be performed for a one level-hierarchy theme model. In some embodiments, this step may be performed using the following:

A lexicon of words 845 identifying whether a word has a bias towards positive or negative sentiment The probability of a second level theme co-occurring with a top level theme given that the top level theme exists is calculated using Bayes law as:

$$P(< T_{top}, T_{second} > | T_{top}) = \frac{|\{s \mid s \in S, T_{top} \in s, T_{second} \in s\}|}{|\{s \mid s \in S, T_{top} \in s\}|}$$

where
- $T_{top}$ represents a top level theme
- $T_{second}$ represents a second level theme
- S represents the set of all sentences being processed
- $|\{ \ldots \}|$ represents the count of all elements in a set
- $|\{s|s \in S, T_{top} \in s, T_{second} \in s\}|$ represents a count of all instances where the top level theme and the bottom level theme are both found.
- $|\{s|s \in S, T_{top} \in s\}|$ represents a count of all instances where the top level theme is found.

The probability of a second level theme co-occurring with a top level theme given that the second level theme exists is calculated as:

$$P(<T_{top}, T_{second}> | T_{second}) = \frac{|\{s \mid s \in S, T_{top} \in s, T_{second} \in s\}|}{|\{s \mid s \in S, T_{second} \in s\}|}$$

where
  $T_{top}$ represents a top level theme
  $T_{second}$ represents a second level theme
  S represents the set of all sentences being processed
  |{ ... }| represents the count of all elements in a set
  $|\{s|s \in S, T_{top} \in s, T_{second} \in s\}|$ represents a count of all instances where the top level theme and the bottom level theme are both found.
  $|\{s|s \in S, T_{second} \in s\}|$ represents a count of all instances where the second level theme is found.

A word or bigram w is a candidate for a second level theme of a top level theme $T_{top}$ if it meets the following criteria:

$$\frac{|\{s \mid s \in S, w \in s\}|}{|S|} > 0.00004 \wedge \overline{distance(w, T_{top},)} \leq$$

$$5 \wedge \left( \begin{bmatrix} PoS(w) = \text{'Noun'} \wedge P(<T_{top}, w> | T_{top}) > 0.01 \wedge P(<T_{top}, w> | w) > 0.2 \\ \wedge sentiment(w) = 0 \wedge PoS(T_{top}) = \text{'Noun'} \end{bmatrix} \| \right.$$

$$\begin{bmatrix} PoS(w) = \text{'Adjective'} \wedge P(<T_{top}, w> | T_{top}) > 0.01 \wedge P(<T_{top}, w> | w) > 0.2 \\ \wedge sentiment(w) = 0 \wedge PoS(T_{top}) = \text{'Noun'} \end{bmatrix} \|$$

$$\begin{bmatrix} PoS(w) = \text{'Numeric'} \wedge P(<T_{top}, w> | T_{top}) > 0.01 \wedge P(<T_{top}, w> | w) > 0.2 \\ \wedge sentiment(w) = 0 \wedge PoS(T_{top}) = \text{'Noun'} \wedge distance(w, T_{top},) = 1 \end{bmatrix} \|$$

$$\begin{bmatrix} PoS(w) = \text{'Noun'} \wedge P(<T_{top}, w> | T_{top}) > 0.01 \wedge P(<T_{top}, w> | w) > 0.2 \\ \wedge sentiment(w) = 0 \wedge PoS(T_{top}) = \text{'Verb'} \end{bmatrix} \|$$

$$\left. \begin{bmatrix} P(<T_{top}, w> | T_{top}) > 0.01 \wedge P(<T_{top}, w> | w) > 0.2 \\ \wedge sentiment(w) <> 0 \end{bmatrix} \right)$$

where
  | represents logical OR
  ^ represents logical AND
  $T_{top}$ represents a top level theme
  sentiment(s) represents the sentiment score assigned to the sentence, may be the result from sentiment scoring 230.
  PoS( ... ) represents the part of speech from part of speech tagging 370

$$\frac{|\{s \mid s \in S, w \in s\}|}{|S|} > 0.00004$$

is true if the word w is found in 0.004% of all sentences
$\overline{distance(w, T_{top},)} \leq 5$ true if the average word distance between word w and top level theme $T_{top}$ is less than or equal to 5

$$\begin{bmatrix} PoS(w) = \text{'Noun'} \wedge P(<T_{top}, w> | T_{top}) > 0.01 \wedge P(<T_{top}, w> | w) > \\ 0.2 \wedge sentiment(w) = 0 \wedge PoS(T_{top}) = \text{'Noun'} \end{bmatrix}$$

is true if $T_{top}$ is a noun, w is a noun with no sentiment and a) when w is found, it is frequently with $T_{top}$ (at least 20% of the time) and b) when $T_{top}$ is found, it is frequently with w (at least 1% of the time)

$$\begin{bmatrix} PoS(w) = \text{'Adjective'} \wedge P(\langle T_{top}, w \rangle | T_{top}) > 0.01 \wedge P(\langle T_{top}, w \rangle | w) > 0.2 \wedge \\ sentiment(w) = 0 \wedge PoS(T_{top}) = \text{'Noun'} \end{bmatrix}$$

is true if $T_{top}$ is a noun, w is an adjective with no sentiment and a) when w is found, it is frequently with $T_{top}$ (at least 20% of the time) and b) when $T_{top}$ is found, it is frequently with w (at least 1% of the time)

$$\begin{bmatrix} PoS(w) = \text{'Numeric'} \wedge P(\langle T_{top}, w \rangle | T_{top}) > 0.01 \wedge P(\langle T_{top}, w \rangle | w) > 0.2 \wedge \\ sentiment(w) = 0 \wedge PoS(T_{top}) = \text{'Noun'} \wedge distance(w, T_{top},) = 1 \end{bmatrix}$$

is true if $T_{top}$ is a noun, w is numeric with no sentiment and a) when w is found, it is frequently with $T_{top}$ (at least 20% of the time) and b) when $T_{top}$ is found, it is frequently with w (at least 1% of the time)

$$\begin{bmatrix} PoS(w) = \text{'Noun'} \wedge P(\langle T_{top}, w \rangle | T_{top}) > 0.01 \wedge P(\langle T_{top}, w \rangle | w) > 0.2 \wedge \\ sentiment(w) = 0 \wedge PoS(T_{top}) = \text{'Verb'} \end{bmatrix}$$

is true if $T_{top}$ is a verb, w is a noun with no sentiment and a) when w is found, it is frequently with $T_{top}$ (at least 20% of the time) and b) when $T_{top}$ is found, it is frequently with w (at least 1% of the time)

$$\begin{bmatrix} P(\langle T_{top}, w \rangle | T_{top}) > 0.01 \wedge P(\langle T_{top}, w \rangle | w) > 0.2 \wedge \\ sentiment(w) <> 0 \end{bmatrix}$$

is true if w is a sentiment bearing word and a) when w is found, it is frequently with $T_{top}$ (at least 20% of the time) and b) when $T_{top}$ is found, it is frequently with w (at least 1% of the time)

From this list of candidates, a culling exercise is done following the steps below:
  Identify the second most frequent Top and Second level pair Set a cutoff threshold as (count of sentences for second most frequent Top and Second level pair/5)

Ignore any candidates which co-occur with their respective top level theme less than the cutoff threshold In some embodiment, second-level themes may be identified by from the pool of words and bigrams. The probability that a second level theme co-occurs with a top level theme given that the top level theme exits may be calculated. Similarly, the probability of a second level theme co-occurring with a top-level theme given that the second level theme exists may be calculated. An item from the pool may be a candidate for a second-level theme if it (1) appears above a certain threshold in the set of documents, (2) appears within a certain distance of a top-level item, and (3) is:

(a) a noun having a sentiment is neutral, having a probability of co-occurring with a top level theme given that the top level theme exists is greater than a first threshold, having a probability of co-occurring with a top level theme given that the item exists is greater than a second threshold, and the top level theme is also a noun; or (b) an adjective having a sentiment is neutral, having a probability of co-occurring with a top level theme given that the top level theme exists is greater than a first threshold, having a probability of co-occurring with a top level theme given that the item exists is greater than a second threshold, and the top level theme is a noun; or (c) an numeric having a sentiment is neutral, having a probability of co-occurring with a top level theme given that the top level theme exists is greater than a first threshold, having a probability of co-occurring with a top level theme given that the item exists is greater than a second threshold, that occurs within a one item of the top level theme, and the top level theme is a noun; or (d) a noun having a sentiment is neutral, having a probability of co-occurring with a top level theme given that the top level theme exists is greater than a first threshold, having a probability of co-occurring with a top level theme given that the item exists is greater than a second threshold, and the top level theme is a verb; or (e) any item with a non-neutral sentiment having a probability of co-occurring with a top level theme given that the top level theme exists is greater than a first threshold and having a probability of co-occurring with a top level theme given that the item exists is greater than a second threshold.

In some embodiments, the identified candidates may be culled by identifying the second most frequent top and second level pair, setting a cutoff threshold as a count of sentences for the second most frequent top and second level pair divided by a value (e.g. 5), and ignoring any top and second level pair which occur less than the cutoff threshold.

Grouping 850 may include steps in which related themes are grouped together using:

a synonym dictionary 855 to group words with similar meaning together a taxonomy 860 to group child concepts together into an overreaching parent group Theme naming 865 may include steps in which identified top-level and second-level themes are assigned labels. In one embodiment, this may be performed with the steps below:

Identify count of cases where the top level theme is found to the immediate right of a second level theme Identify count of cases where top level theme was found to the immediate left of a second level theme Identify count of cases where the top level theme was found to the right of a second level theme and both are separated by a preposition Identify count of cases where the top level theme was found to the left of a second level theme and both are separated by a preposition From above set, identify which was the most frequently found pattern and determine the most commonly inflected word combination within that pattern. Use that pattern as the name If no pattern is detected using above steps then name the theme "Top Level Theme Name Second Level Theme Name"

Rule generation 870 may include steps in which text patterns to identify a theme are identified. In one embodiment this may be performed with the following steps:

For top level themes that are generated directly from a stemmed word, include all possible inflections of the stemmed word combined using logical disjunction—i.e. a document would be said to contain the said theme if any one of the rule conditions are met For top level themes that are generated from a bigram, define a cross product of rules by using all possible inflections of the left token of the bigram combined with all possible inflections of the right token of the bigram. In one embodiment a bigram pattern is considered if the left token of the bigram is found within 4 tokens of the right bigram. All rules are combined using logical disjunction—i.e. a document would be said to contain the said theme if any one of the rule conditions are met For top level themes that are generated from grouping 850 using taxonomy 860, define all possible member children of the taxonomy grouping and identify all possible inflections of each child. All rules are combined using logical disjunction—i.e. a document would be said to contain the said theme if any one of the rule conditions are met For top level themes that are generated from grouping 850 using synonym dictionary 855, define all possible synonyms and identify all possible inflections of each individual synonym. All rules are combined using logical disjunction—i.e. a document would be said to contain the said theme if any one of the rule conditions are met For second level themes that are generated directly from a stemmed word, include all possible inflections of the stemmed word combined using logical disjunction—i.e. a document would be said to contain the said theme if any one of the rule conditions are met For second level themes that are generated from a bigram, define a cross product of rules by using all possible inflections of the left token of the bigram combined with all possible inflections of the right token of the bigram. In one embodiment a bigram pattern is considered if the left token of the bigram is found within 4 tokens of the right bigram. All rules are combined using logical disjunction—i.e. a document would be said to contain the said theme if any one of the rule conditions are met For second level themes that are generated from grouping 850 using taxonomy 860, define all possible member children of the taxonomy grouping and identify all possible inflections of each child. All rules are combined using logical disjunction—i.e. a document would be said to contain the said theme if any one of the rule conditions are met For second level themes that are generated from grouping 850 using synonym dictionary 855, define all possible synonyms and identify all possible inflections of each individual synonym. All rules are combined using logical disjunction—i.e. a document would be said to contain the said theme if any one of the rule conditions are met Generated category model 875 represents a two-level hierarchy of themes or a one-level hierarchy of themes.

Figure 9:
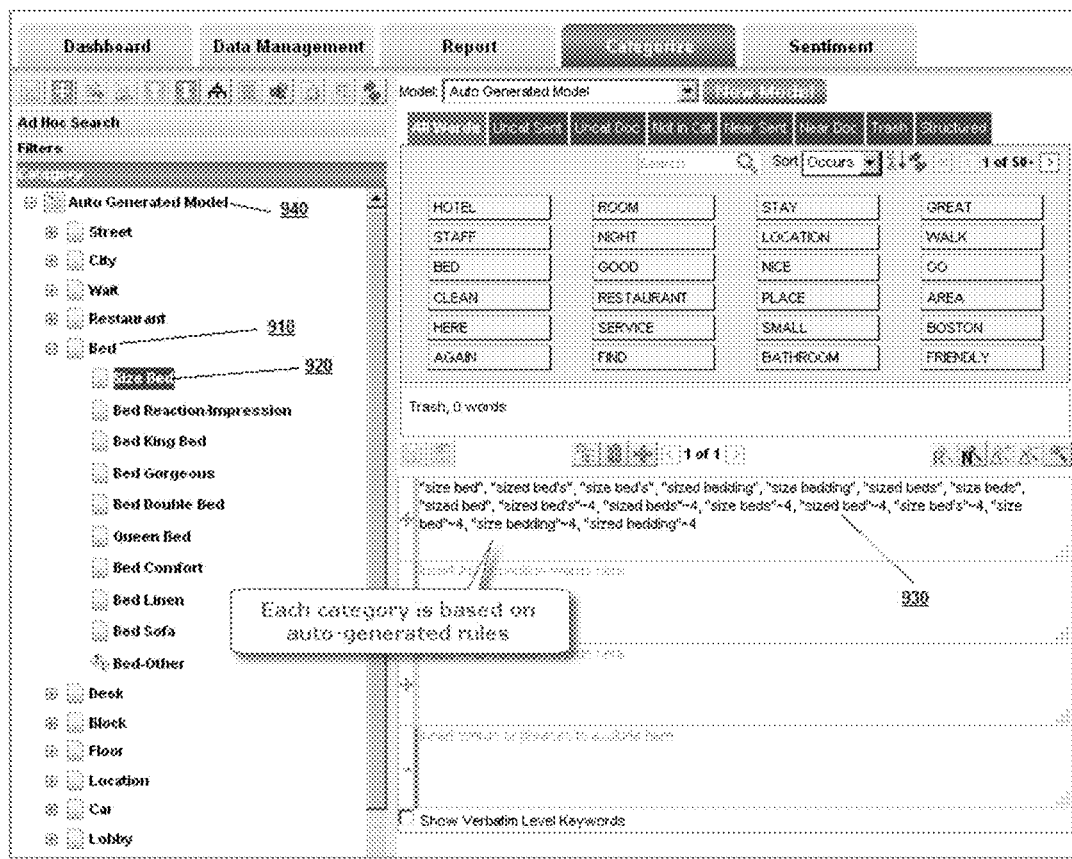
FIG. 9 depicts an exemplary application 900 in accordance with one or more embodiments.

FIG. 9 depicts an exemplary application 900 in accordance with one or more embodiments, in which a category model 940 is generated from a document collection.

Category model 940 depicts a two level hierarchical model of themes discovered using unsupervised theme identification techniques.

At the highest level of the hierarchy in category model 940, there are parent level themes such as parent theme 910. Parent themes may automatically assigned a label. For example, parent theme 910 is named "Bed".

At the second level of the hierarchy in category model 940, there are child level themes, such as child theme 920 which is a child of parent theme 910. Child themes may be assigned a label. For example, child theme 920 is named "Size Bed".

Every parent theme and child theme in category model 940 may associated with one or more rules that describe a Boolean pattern for determining whether a document discusses the theme topic. Rules 930 are an example of text patterns that may be used to determine whether a document can be classified with child theme 920.

Figure 10:
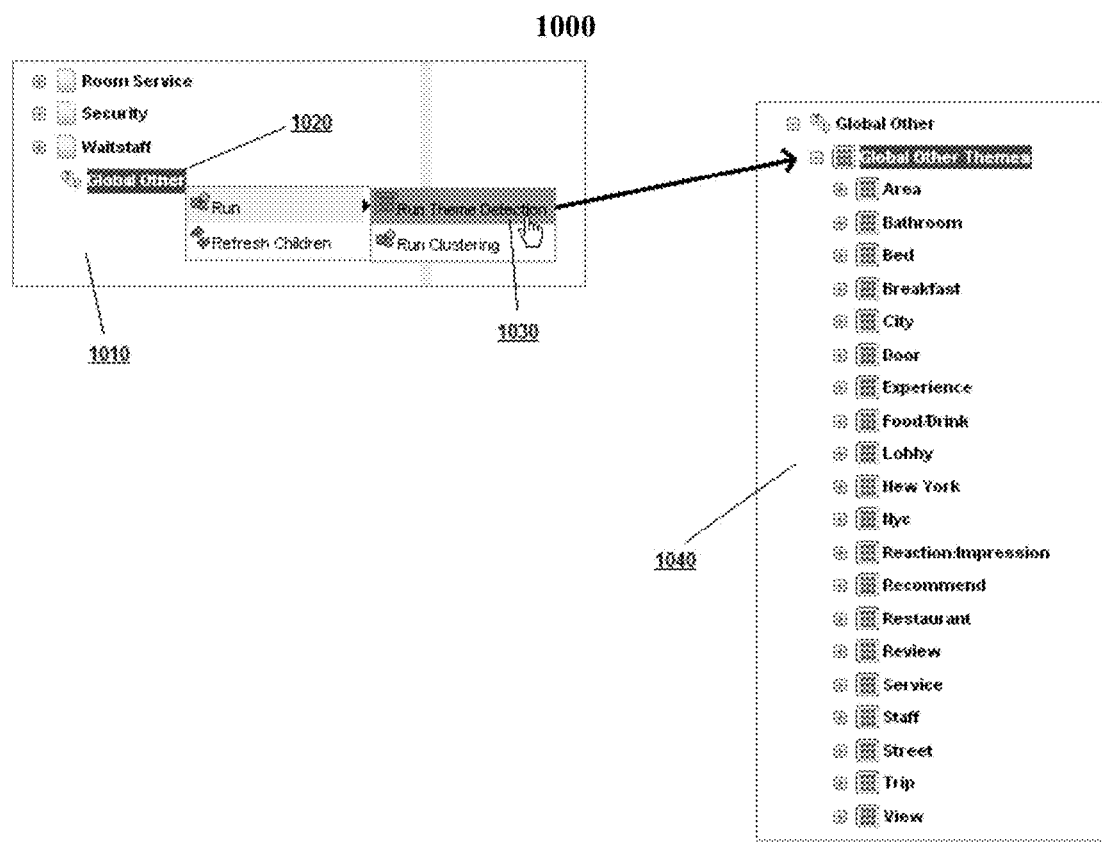
FIG. 10 depicts an exemplary application 1000 running theme detection against unclassified documents in a previously classified document set in accordance with one or more embodiments.

FIG. 10 depicts an exemplary application 1000 running theme detection against unclassified documents in a previously classified document set in accordance with one or more embodiments.

Categorization model 1010 may represent a human created hierarchical categorization model or may represent an automatically generated categorization model using theme detection.

Document collection 1020 may represent any uncategorized documents when applying categorization model 1010 to a document collection. In this illustration, the collection of uncategorized documents is labeled as "Global Other".

A user may select an option to run theme detection 1030 against uncategorized documents 1020.

Display 1040 may represent the results of automatically discovered themes from the set of uncategorized documents.

Figure 11:
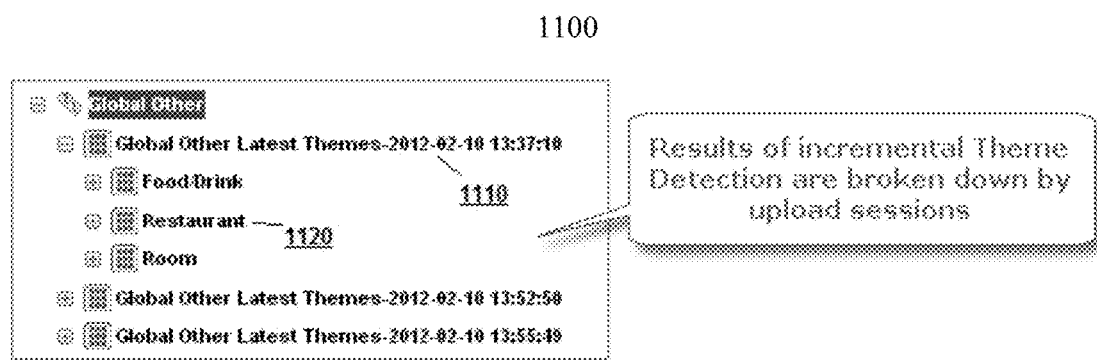
FIG. 11 depicts an exemplary application 1100 displaying results of running theme detection against newly acquired documents to discover new themes in accordance with one or more embodiments.

FIG. 11 depicts exemplary results 1100 of running theme detection against newly acquired documents to discover new themes in accordance with one or more embodiments.

Item 1110 may depict the results of theme detection against documents acquired at date time "10 Feb. 2012 13:37:10".

Theme 1120 may depict a specific theme identified from newly determined themes 1110.

Figure 12:
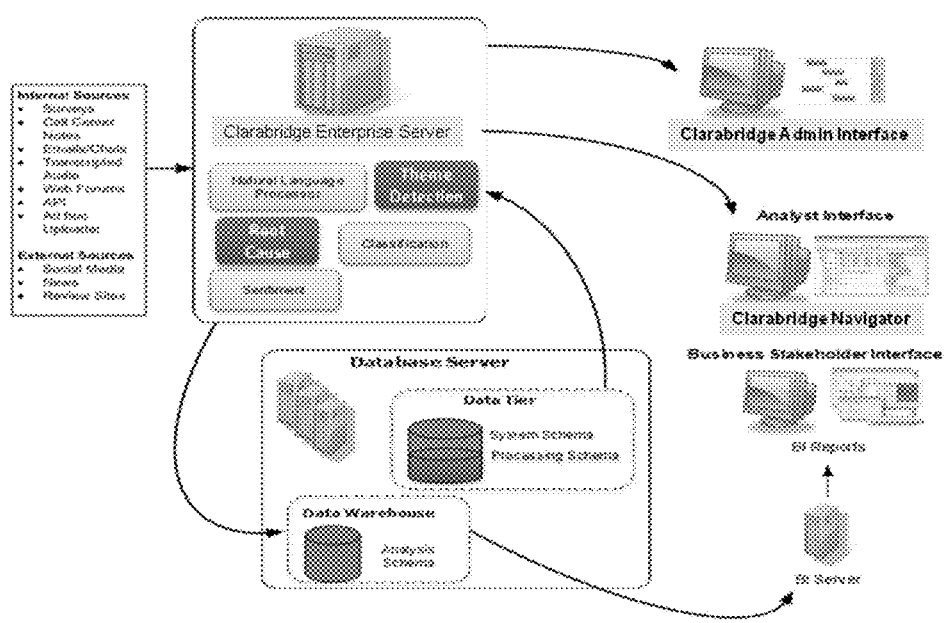
FIG. 12 depicts an exemplary system 1200 in accordance with one or more embodiments.

FIG. 12 depicts an exemplary system 1200 in accordance with one or more embodiments. The elements of system 1200 may operate similarly to those depicted and/or described with respect to system 100.

Figure 13:
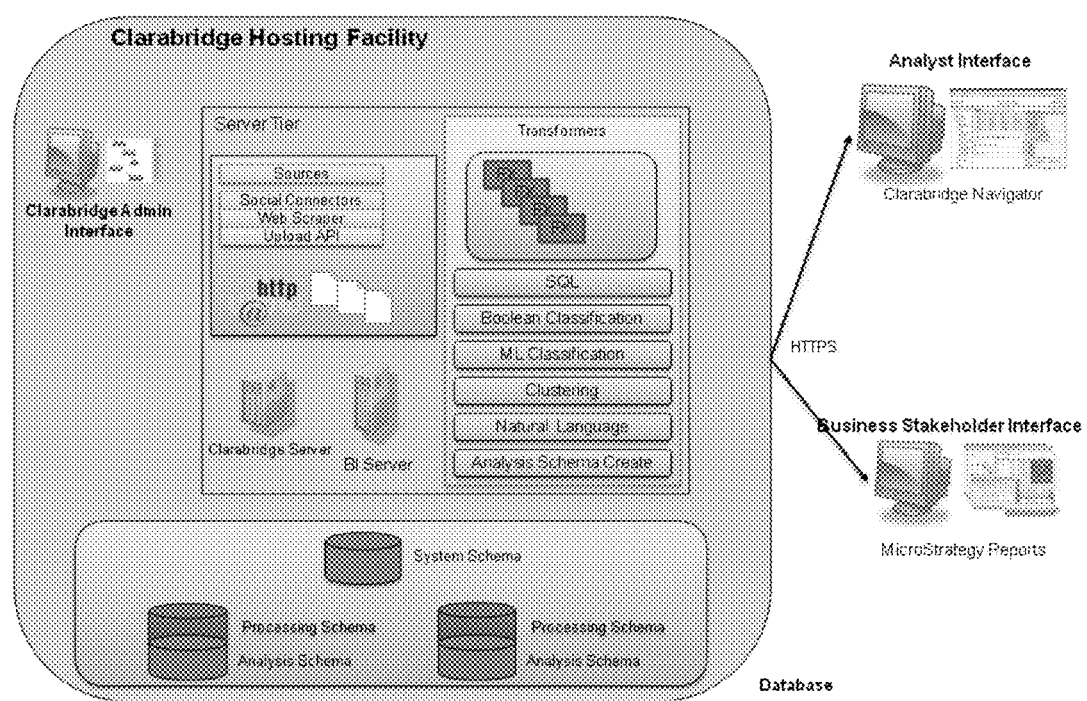
FIG. 13 depicts an exemplary system 1300 in accordance with one or more embodiments.

FIG. 13 depicts an exemplary system 1300 in accordance with one or more embodiments. System 1300 may represent one or more embodiments in which system 100 is deployed in a multi-tenant software-as-a-services (SaaS) configuration.

As will be appreciated by one of skill in the art, aspects of the present invention may be embodied as a method, data processing system, or computer program product. Accordingly, aspects of the present invention may take the form of an entirely hardware embodiment or an embodiment combining software and hardware aspects, all generally referred to herein as system. Furthermore, elements of the present invention may take the form of a computer program product on a computer-usable storage medium having computer-usable program code embodied in the medium. Any suitable computer readable medium may be utilized, including hard disks, CD-ROMs, optical storage devices, flash RAM, transmission media such as those supporting the Internet or an intranet, or magnetic storage devices.

Computer program code for carrying out operations of the present invention may be written in an object oriented programming language such as JAVA, C#, Smalltalk or C++, or in conventional procedural programming languages, such as the Visual Basic or "C" programming language. The program code may execute entirely on the user's computer, partly on the user's computer, as a stand-alone software package, partly on the user's computer and partly on a remote computer, or entirely on the remote computer, or partially or entirely on a cloud environment. In the latter scenarios, the remote computer or cloud environments may be connected to the user's computer through a local area network (LAN) or a wide area network (WAN), or the connection may be made to an external computer (for example, through the Internet using an Internet Service Provider).

Aspects of the present invention are described with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, server, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer, server or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks, and may operate alone or in conjunction with additional hardware apparatus described herein.

Figure 14:
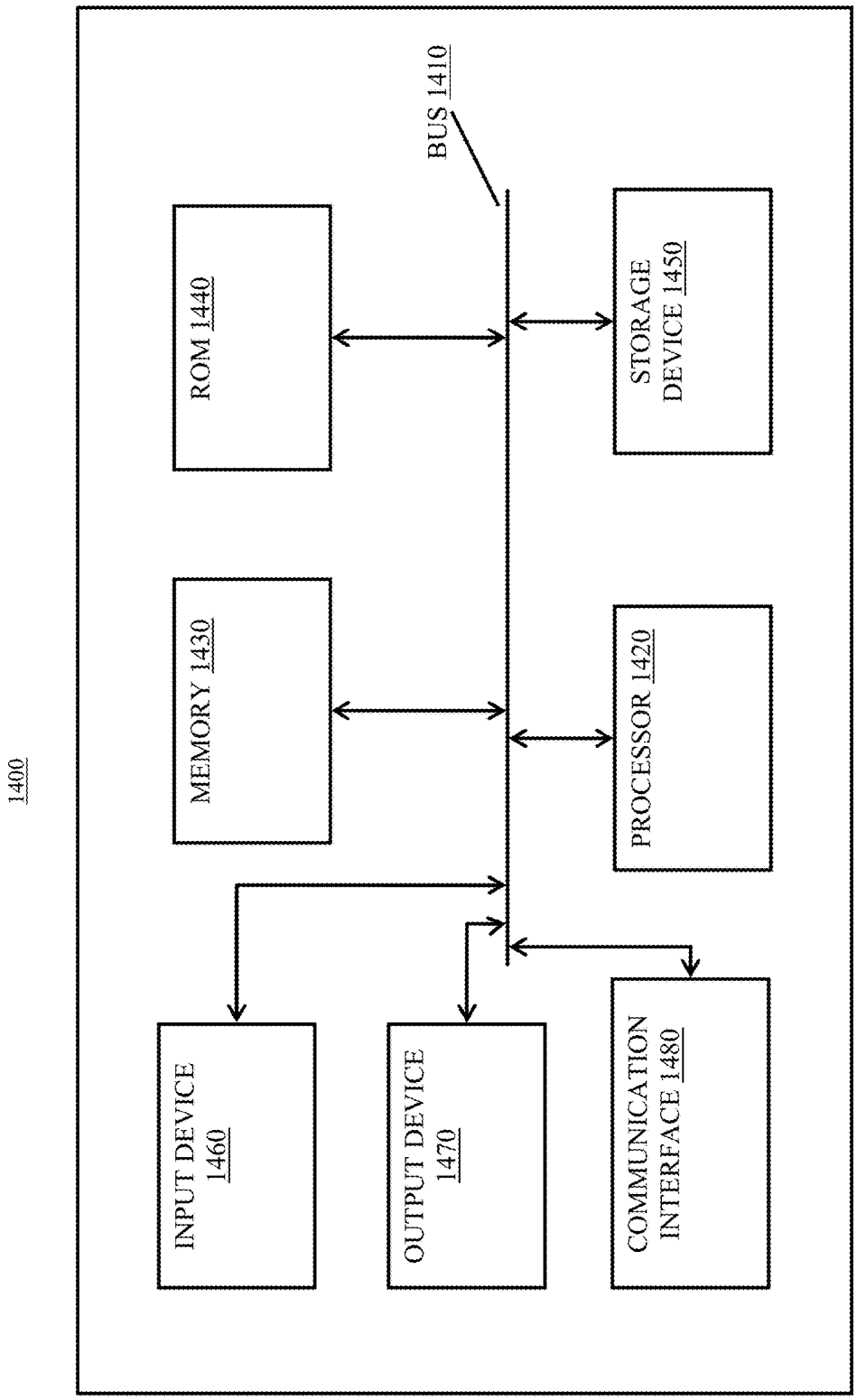
FIG. 14 depicts an exemplary architecture for implementing a computing device in accordance with one or more embodiments.

FIG. 14 depicts an exemplary architecture for implementing a computing device 1400 in accordance with one or more embodiments, which may be used to implement any of enterprise server 110, database server 120, one or ddmore external sources 130, one or more internal sources 140, navigator device 150, administrator device 160, business intelligence server 170, and business intelligence report device 180, or any other computer system or computing device component thereof. It will be appreciated that other devices that can be used with the computing device 1400, such as a client or a server, may be similarly configured. As illustrated in FIG. 14, computing device 1400 may include a bus 1410, a processor 1420, a memory 1430, a read only memory (ROM) 1440, a storage device 1450, an input device 1460, an output device 1470, and a communication interface 1480.

Bus 1410 may include one or more interconnects that permit communication among the components of computing device 1400. Processor 1420 may include any type of processor, microprocessor, or processing logic that may interpret and execute instructions (e.g., a field programmable gate array (FPGA)). Processor 1420 may include a single device (e.g., a single core) and/or a group of devices (e.g., multi-core). Memory 1430 may include a random access memory (RAM) or another type of dynamic storage device that may store information and instructions for execution by processor 1420. Memory 1430 may also be used to store temporary variables or other intermediate information during execution of instructions by processor 1420.

ROM 1440 may include a ROM device and/or another type of static storage device that may store static information and instructions for processor 1420. Storage device 1450 may include a magnetic disk and/or optical disk and its corresponding drive for storing information and/or instructions. Storage device 1450 may include a single storage device or multiple storage devices, such as multiple storage devices operating in parallel. Moreover, storage device 1450 may reside locally on the computing device 1400 and/or may be remote with respect to a server and connected thereto via network and/or another type of connection, such as a dedicated link or channel.

Input device 1460 may include any mechanism or combination of mechanisms that permit an operator to input information to computing device 1400, such as a keyboard, a mouse, a touch sensitive display device, a microphone, a pen-based pointing device, and/or a biometric input device, such as a voice recognition device and/or a finger print scanning device. Output device 1470 may include any mechanism or combination of mechanisms that outputs information to the operator, including a display, a printer, a speaker, etc.

Communication interface 1480 may include any transceiver-like mechanism that enables computing device 1400 to communicate with other devices and/or systems, such as a client, a server, a license manager, a vendor, etc. For example, communication interface 1480 may include one or more interfaces, such as a first interface coupled to a network and/or a second interface coupled to a license manager. Alternatively, communication interface 1480 may include other mechanisms (e.g., a wireless interface) for communicating via a network, such as a wireless network. In one implementation, communication interface 1480 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 1400 may perform certain functions in response to processor 1420 executing software instructions contained in a computer-readable medium, such as memory 1430. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A system comprising:
a repository of unstructured documents stored in a computing system;
a natural language processor configured to perform language processing; and
a non-transitory computer-readable storage medium comprising instructions that, when executed, enable a computing system to detect themes within the unstructured documents by:
removing noise words from the unstructured documents, to yield clean documents;
initiate a sentiment computation component configured to determine sentiment of each word in the clean documents by:
assigning to each word in the clean documents at least one of a positive sentiment, a negative sentiment, and neutral sentiment, to yield assigned sentiments;
determining a sentiment probability of a section of the unstructured data based on the assigned sentiments of words in the section, to yield assigned sectional sentiment; and
determining an overall sentiment probability distribution for the unstructured documents based on the assigned sectional sentiment of multiple sections of the unstructured documents;
initiate a theme detection component configured to:
discover themes based on topics with neutral sentiment when the topics are located in a section of the unstructured documents with a sentiment probability that is greater than an overall sentiment probability distribution;
assign labels to each discovered theme;
identify patterns that describe each theme;
identify instances of the themes within individual documents of the unstructured documents based on a presence of the patterns in the individual documents; and
organize the themes in a hierarchy using the instances of the themes; and
initiate a user interface configured to:
allow an operator to initiate theme detection by the theme detection component; and
allow an operator to view and interact with results of the theme detection, wherein the results comprise at least one of the assigned labels, the patterns, and the hierarchy.

2. The system of claim 1, further comprising:
a component configured to:
acquire additional unstructured documents; and
add the additional unstructured documents to the repository of unstructured documents.

3. The system of claim 1, further comprising:
a natural language processing component configured to extract features from unstructured text,
wherein the theme detection component uses the extracted features in the theme detection process.

4. The system of claim 1, wherein the section of the unstructured data is a sentence.

5. The system of claim 4, wherein each sentence in the unstructured documents has an assigned sentiment based on sentiments of individual, non-noise words contained within each respective sentence.

6. The system of claim 1,
wherein the theme detection component uses the determined sentiment to weight the significance of a discovered theme.

7. The system of claim 1, wherein the themes organized into the hierarchy comprise top level themes and second level themes,
wherein the second level themes are based on terms that appear in the unstructured documents at a frequency above a predetermined threshold, and
wherein a second level theme is associated with a top-level theme if terms of the second level theme appear within a predetermined distance of the top-level theme.

8. The system of claim 1, wherein the themes organized into the hierarchy comprise top level themes and second level themes, and
wherein a second level theme is based on a term that co-occurs with a top level theme for at least a predetermined percentage of total occurrences of the term.

9. The system of claim 8, wherein the second level theme is also based on the co-occurrence of the term with the top level theme above a predetermined percentage of total occurrences of the top level theme.

10. The system of claim 1, wherein the hierarchy includes top level themes and second level themes, the second level themes being based on terms that co-occur with the top level themes and being created using parts of speech of terms, and
wherein the second level themes comprise frequently co-occurring nouns and adjectives if the top level theme is a noun, and wherein the second level themes comprise frequently co-occurring nouns if the top level theme is a verb.

11. A method of determining themes from a collection of unstructured text documents, the method comprising:
receiving a set of unstructured text documents to process;
removing noise words from the unstructured text documents, to yield clean documents;
initiate a language processing component configured to process unstructured data collected from the unstructured text documents;
determining, by a computer system configured to perform natural language processing, sentiment associated with each word in the clean documents, by:
assigning to each word in the clean documents at least one of a positive sentiment, a negative sentiment, and a neutral sentiment, to yield assigned sentiments;
determining a sentiment probability of a section of the unstructured data based on the assigned sentiments of words in the section; and
determining an overall sentiment probability distribution for the unstructured documents based on the assigned sectional sentiment of multiple sections of the unstructured text documents;
determining, by a computing system, a first set of topics within the unstructured text documents of the set and determining a second set of topics based on frequently occurring terms within the set of unstructured text documents;

determining, by the computing system, a label for each term in the frequently occurring terms;

determining, by the computing system, one or more text patterns, wherein the one or more text patterns are used to identify if a term is contained within a document; and creating, by the computing system, a category model to organize the identified terms as themes in a hierarchical structure that includes top level themes, wherein a topic having neutral sentiment is identified as a theme when the topic is located in a section of the unstructured text documents with a sentiment probability that is greater than an overall sentiment probability distribution.

12. The method of claim 11, wherein the section of the unstructured data is a sentence.

13. The method of claim 11, further comprising:
creating second level themes based on terms that co-occur with the top level discovered themes; and
incorporating the second level themes into the category model.

14. The method of claim 11, further comprising:
selecting nouns and verbs as top level themes using parts of speech of terms.

15. The method of claim 14, further comprising:
selecting a noun as top level themes if the noun demonstrates a tendency to appear more in sentences expressing neutral sentiment, and
selecting a noun as a second level theme when the noun demonstrates a positive or negative sentiment.

16. The method of claim 14, further comprising:
using verbs as a top level theme only if the verb is associated with neutral sentiment.

17. The method of claim 13, wherein the creating the second level themes based on terms that co-occur with the top level discovered themes further comprises:
creating the second level of themes using parts of speech of terms, wherein the second level themes comprise frequently co-occurring nouns and adjectives if the top level theme is a noun, and wherein the second level themes comprise frequently co-occurring nouns if the top level theme is a verb.

18. The method of claim 11, wherein the set of unstructured text documents comprises categorized documents and uncategorized documents; and wherein the receiving the set of unstructured text documents to process further comprises:
removing the categorized documents from the set of unstructured text documents prior to identifying themes.

19. The method of claim 11, wherein the set of unstructured text documents comprises uncategorized documents, and wherein the receiving the set of unstructured text documents to process further comprises:
isolating the uncategorized documents to process for theme detection from a current unstructured document harvest, wherein only uncategorized documents from a document categorization step are used in the current unstructured document harvest.

20. The method of claim 11, further comprising:
grouping the top level themes using an ontology to produce one or more groups, wherein each of the one or more groups contains themes that are related according to the ontology.

21. The method of claim 11, further comprising:
grouping top level themes using a synonym dictionary to produce one or more groups, wherein each of the one or more groups contains themes that are related according to the synonym dictionary.

22. The method of claim 13, further comprising:
grouping second level themes using ontology to produce one or more groups, wherein each of the one or more groups contains themes that are related according to the ontology.

23. The method of claim 13, further comprising:
grouping second level themes using a synonym dictionary to produce one or more groups, wherein each of the one or more groups contains themes that are related according to the synonym dictionary.

24. The method of claim 11, wherein the hierarchical structure further includes second level themes, and
wherein a second level theme is based on a term that co-occurs with a top level theme for at least a predetermined percentage of total occurrences of the term.

25. The method of claim 24, wherein the second level theme is also based on the co-occurrence of the term with the top level theme above a predetermined percentage of total occurrences of the top level theme.

26. A non-transitory computer-readable storage medium comprising instructions that when executed enable a natural language processing computing system to:
receiving a set of unstructured text documents to process;
removing noise words from the unstructured text documents, to yield clean documents;
initiate a language processing component configured to process unstructured data collected from the unstructured text documents;
determining sentiment associated with each word in the clean documents, by:
assigning to each word in the clean documents at least one of a positive sentiment, a negative sentiment, and a neutral sentiment, to yield assigned sentiments;
determining a sentiment probability of a section of the unstructured data based on the assigned sentiments of words in the section; and
determining an overall sentiment probability distribution for the unstructured documents based on the assigned sectional sentiment of multiple sections of the unstructured text documents;
determining a first set of topics within the unstructured text documents of the set and determining a second set of topics based on frequently occurring terms within the set of unstructured text documents;
determining a label for each term in the frequently occurring terms;
determining one or more text patterns, wherein the one or more text patterns are used to identify if a term is contained within a document; and
creating a category model to organize the identified terms as themes in a hierarchical structure that includes top level themes,
wherein a topic having neutral sentiment is identified as a theme when the topic is located in a section of the unstructured text documents with a sentiment probability that is greater than an overall sentiment probability distribution.

27. The non-transitory computer-readable storage medium of claim 26,
wherein the section of the unstructured data is a sentence.

28. The non-transitory computer-readable storage medium of claim 26, further comprising instructions that when executed enable the computing system to:
create second level themes based on terms that co-occur with the top level discovered themes; and
incorporate the second level themes into the category model.

29. The non-transitory computer-readable storage medium of claim 26, further comprising instructions that when executed enable the computing system to:
select nouns and verbs as top level themes using parts of speech of terms.

30. The non-transitory computer-readable storage medium of claim 29, further comprising instructions that when executed enable the computing system to:
select a noun as top level themes if the noun demonstrates a tendency to appear more in sentences expressing sentiment.

31. The non-transitory computer-readable storage medium of claim 29, further comprising instructions that when executed enable the computing system to:
use verbs as a top level theme only if the verb is associated with sentiment.

32. The non-transitory computer-readable storage medium of claim 28, wherein the instructions for creating second level themes based on terms that co-occur with the top level discovered themes further comprise instructions that when executed enable the computing system to:
create the second level of themes using parts of speech of terms, wherein the second level themes comprise frequently co-occurring nouns and adjectives if the top level theme is a noun, and wherein the second level themes comprise frequently co-occurring nouns if the top level theme is a verb.

33. The non-transitory computer-readable storage medium of claim 26, wherein the set of unstructured text documents comprises categorized documents and uncategorized documents; and wherein the instructions for receiving the set of unstructured text documents to process further comprise instructions that when executed enable the computing system to:
remove the categorized documents from the set of unstructured text documents prior to identifying themes.

34. The non-transitory computer-readable storage medium of claim 26, wherein the set of unstructured text documents comprises categorized documents and uncategorized documents; and wherein the instructions for receiving the set of unstructured text documents to process further comprise instructions that when executed enable the computing system to:
isolate uncategorized documents to process for theme detection from a current unstructured document harvest, wherein only uncategorized documents from a document categorization step are used in the current unstructured document harvest.

35. The non-transitory computer-readable storage medium of claim 26, further comprising instructions that when executed enable the computing system to:
group the top level themes using an ontology to produce one or more groups, wherein each of the one or more groups contains themes that are related according to the ontology.

36. The non-transitory computer-readable storage medium of claim 26, further comprising instructions that when executed enable the computing system to:
group top level themes using a synonym dictionary to produce one or more groups, wherein each of the one or more groups contains themes that are related according to the synonym dictionary.

37. The non-transitory computer-readable storage medium of claim 28, further comprising instructions that when executed enable the computing system to:
group second level themes using ontology to produce one or more groups, wherein each of the one or more groups contains themes that are related according to the ontology.

38. The non-transitory computer-readable storage medium of claim 28, further comprising instructions that when executed enable the computing system to:
group second level themes using a synonym dictionary to produce one or more groups, wherein each of the one or more groups contains themes that are related according to the synonym dictionary.

39. The non-transitory computer-readable storage medium of claim 26, wherein the hierarchical structure further includes second level themes, and
wherein a second level theme is based on a term that co-occurs with a top level theme for at least a predetermined percentage of total occurrences of the term.

40. The non-transitory computer-readable storage medium of claim 39, wherein the second level theme is also based on the co-occurrence of the term with the top level theme above a predetermined percentage of total occurrences of the top level theme.

41. The non-transitory computer-readable storage medium of claim 26, wherein the hierarchical structure also include second level themes based on terms that co-occur with the top level themes, the second level themes being created using parts of speech of terms,
wherein the second level themes being incorporated into the category model, and
wherein the second level themes comprise frequently co-occurring nouns and adjectives if the top level theme is a noun, and wherein the second level themes comprise frequently co-occurring nouns if the top level theme is a verb.

* * * * *